(12) United States Patent
Frankel et al.

(10) Patent No.: US 12,273,144 B2
(45) Date of Patent: Apr. 8, 2025

(54) SATELLITE OPTICAL TRANSCEIVERS

(71) Applicant: Ciena Corporation, Hanover, MD (US)

(72) Inventors: Michael Y. Frankel, Hallandale Beach, FL (US); James Westdorp, Perry Hall, MD (US)

(73) Assignee: Ciena Corporation, Hanover, MD (US)

( * ) Notice: Subject to any disclaimer, the term of this patent is extended or adjusted under 35 U.S.C. 154(b) by 221 days.

(21) Appl. No.: 18/187,341

(22) Filed: Mar. 21, 2023

(65) Prior Publication Data

US 2023/0308182 A1 Sep. 28, 2023

Related U.S. Application Data

(60) Provisional application No. 63/322,161, filed on Mar. 21, 2022.

(51) Int. Cl.
| | |
|---|---|
| *H04B 10/118* | (2013.01) |
| *H04B 10/112* | (2013.01) |
| *H04B 10/40* | (2013.01) |
| *H04B 10/50* | (2013.01) |
| *H04B 10/60* | (2013.01) |

(52) U.S. Cl.
CPC ....... *H04B 10/118* (2013.01); *H04B 10/1127* (2013.01); *H04B 10/40* (2013.01); *H04B 10/50* (2013.01); *H04B 10/60* (2013.01)

(58) Field of Classification Search
None
See application file for complete search history.

(56) References Cited

U.S. PATENT DOCUMENTS

| | | | |
|---|---|---|---|
| 6,243,175 B1 | 6/2001 | Pelekhaty | |
| 6,795,607 B1 | 9/2004 | Archambault et al. | |
| 7,184,215 B2 | 2/2007 | Pelekhaty | |
| 7,415,208 B1 | 8/2008 | Haggans et al. | |
| 7,853,156 B2 | 12/2010 | Grigoryan et al. | |
| 7,853,157 B2 | 12/2010 | Grigoryan et al. | |
| 8,005,375 B2 | 8/2011 | Frankel | |
| 8,625,994 B2 | 1/2014 | Archambault et al. | |
| 8,699,880 B2 | 4/2014 | Grigoryan et al. | |
| 8,977,125 B2 | 3/2015 | Grigoryan et al. | |
| 9,191,117 B2 | 11/2015 | Alexander et al. | |
| 9,270,405 B2 | 2/2016 | Blair et al. | |
| 9,374,166 B2 | 6/2016 | Mateosky et al. | |
| 9,509,410 B2 | 11/2016 | Mateosky et al. | |
| 9,515,767 B2 | 12/2016 | Frankel et al. | |

(Continued)

OTHER PUBLICATIONS

Pan "Satellite Payloads Pay Off", IEEE Microwave Magazine. Jul. 30, 2015;16(8):61-73. (Year: 2015).*

(Continued)

*Primary Examiner* — Darren E Wolf
(74) *Attorney, Agent, or Firm* — Baratta Law PLLC; Lawrence A. Baratta, Jr.

(57) ABSTRACT

A satellite includes a plurality of transceivers, each configured to selectively connect to one of another transceiver in another satellite and a ground station; and configurable pass-through between the plurality of transceivers that is configured based on a location of the satellite in a constellation. The configurable pass-through can provide data signal pass-through without one or more of full decoding, regeneration, and error correction, thereby saving power.

20 Claims, 14 Drawing Sheets

(56) References Cited

U.S. PATENT DOCUMENTS

| | | | |
|---|---|---|---|
| 9,551,836 | B2 | 1/2017 | Frankel et al. |
| 10,141,926 | B2 | 11/2018 | Frankel et al. |
| 10,142,092 | B2 | 11/2018 | Pelekhaty et al. |
| 10,171,169 | B2 | 1/2019 | Frankel et al. |
| 10,194,221 | B2 | 1/2019 | Frankel et al. |
| 10,200,305 | B2 | 2/2019 | Frankel et al. |
| 10,212,496 | B2 | 2/2019 | Frankel et al. |
| 10,313,014 | B2 | 6/2019 | Frankel et al. |
| 10,313,021 | B1 | 6/2019 | Frankel et al. |
| 10,404,365 | B2 | 9/2019 | Frankel et al. |
| 10,476,815 | B2 | 11/2019 | Frankel et al. |
| 10,715,888 | B2 | 7/2020 | Swinkels et al. |
| 10,749,602 | B2 | 8/2020 | Charlton et al. |
| 11,026,001 | B1 | 6/2021 | Frankel et al. |
| 11,063,667 | B1 | 7/2021 | Ritter |
| 11,128,373 | B1 | 9/2021 | Podmore et al. |
| 11,329,728 | B1 * | 5/2022 | Adams ............... H04B 10/532 |
| 2005/0100271 | A1 | 5/2005 | Frankel |
| 2005/0100339 | A1 * | 5/2005 | Tegge ............... H04B 10/118 398/125 |
| 2012/0281740 | A1 | 11/2012 | Fujita et al. |
| 2014/0016941 | A1 * | 1/2014 | Coleman ............ H04B 7/18521 398/121 |
| 2018/0006712 | A1 * | 1/2018 | Hreha ............... H04W 72/0453 |
| 2018/0269972 | A1 | 9/2018 | Djordjevic et al. |
| 2019/0028197 | A1 | 1/2019 | Turner et al. |
| 2019/0082481 | A1 | 3/2019 | Ravishankar et al. |
| 2019/0182180 | A1 | 6/2019 | Frankel et al. |
| 2020/0236064 | A1 | 7/2020 | Frankel et al. |
| 2021/0058685 | A1 | 2/2021 | Frankel et al. |
| 2021/0075746 | A1 | 3/2021 | Frankel et al. |
| 2022/0209868 | A1 | 6/2022 | Frankel et al. |

OTHER PUBLICATIONS

Qi Xiaogang et al., "A survey of routing techniques for satellite networks," Journal of Communications and Information Networks, vol. 1, No. 4, DOI: 10.11959/j.issn.2096-1081, 2016.058, Review Paper, Dec. 2016, pp. 67-85.

* cited by examiner

SATELLITE OPTICAL TRANSCEIVERS

CROSS-REFERENCE TO RELATED APPLICATION(S)

The present disclosure claims priority to U.S. Provisional Patent Application No. 63/322,161, filed Mar. 21, 2022, the contents of which are incorporated by reference in their entirety.

FIELD OF THE DISCLOSURE

The present disclosure generally relates to optical networking systems and methods. More particularly, the present disclosure relates to satellite optical transceivers that include Field Programmable Gate Arrays (FPGAs) as well as Digital Signal Processors (DSPs), Application Specification Integrated Circuits (ASICs), and combinations thereof.

BACKGROUND OF THE DISCLOSURE

In terrestrial applications, optical networks are formed by fiber optic cables and various equipment (amplifiers, multiplexers, switches, etc.). In space, optical interconnect can be formed by direct, free space connections of optical transceivers between satellites. Satellites present a unique environment for the application of optical interconnect links. For example, satellites can be configured in a dense constellation with mesh interconnect, with a typical satellite connected to four near neighbors. Most satellites simply serve to pass traffic through to the next satellite along a path towards a downlink to a ground station. Connections between orbital planes persist only for minutes (Low Earth Orbit (LEO) full orbit time is ~90 min). Satellites are highly constrained in terms of launch size, weight and in-service power consumption, and hardware cannot be upgraded or repaired after launch, requiring enhanced protection and software-based/upgrade capabilities.

BRIEF SUMMARY OF THE DISCLOSURE

The present disclosure relates to satellite optical transceivers, and specifically to address the unique environment for the application of optical interconnect links therein. In an embodiment, the present disclosure includes transceiver subsystem components that are aggregated together and that incorporate data bypass (pass through) paths, which are advantageous given the nature of the interconnect and the fact that most traffic is pass through. In another embodiment, a control plane is provided that proactively computes concatenated optical link budgets based on satellite orbit projections as well as expected traffic patterns and required path data capacities. Optimization can be performed based on these computations to select a particular pass through option that minimizes power consumption and data latency, while delivering required capacity and enhancing link reliability. In a further embodiment, individual transceiver subsystems can be operationally isolated. This, combined with data pass through inherently enhances overall resilience as subsystems that fail (i.e., FPGA, DSP, etc.) can be programmatically bypassed during their failure, reboots, etc., while still preserving data path connectivity.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1A:
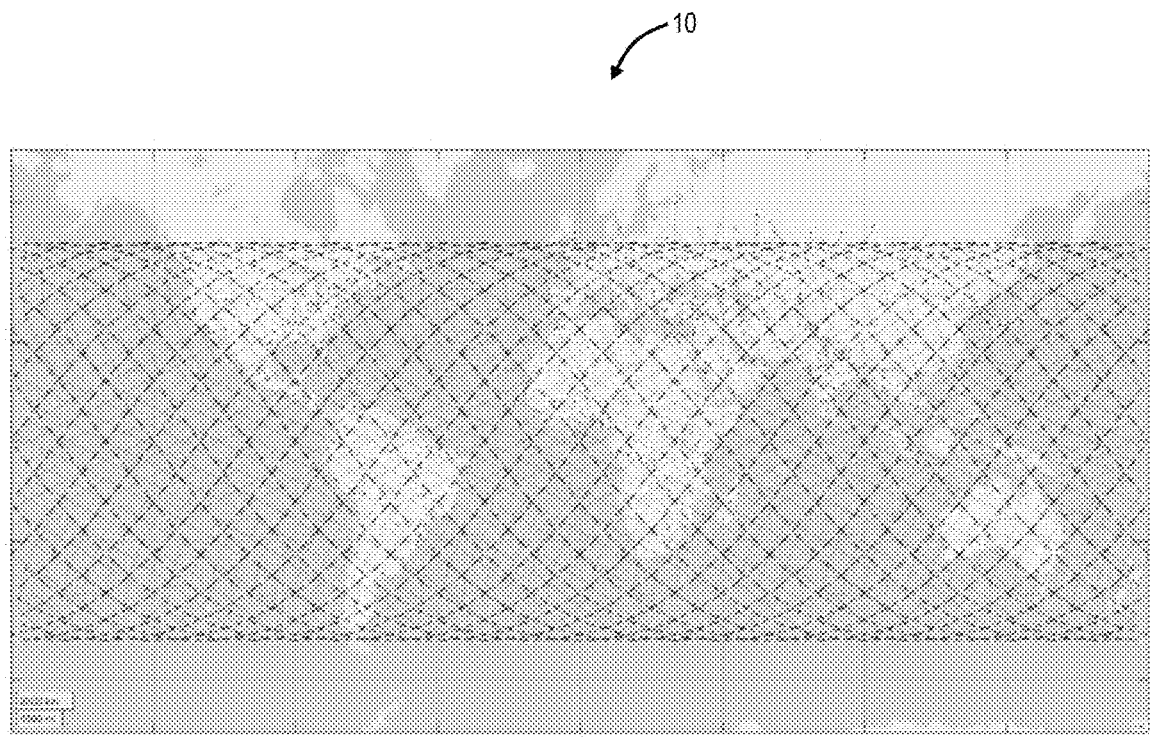
FIG. 1A is a map of the Earth illustrating an example Low Earth Orbit (LEO) satellite optical network.

Again, the present disclosure relates to satellite optical transceivers, and specifically to address the unique environment for the application of optical interconnect links therein. In an embodiment, the present disclosure includes transceiver subsystem components that are aggregated together and that incorporate data bypass (pass through) paths, which are advantageous given the nature of the interconnect and the fact most traffic is pass through. In another embodiment, a control plane is provided that proactively computes concatenated optical link budgets based on satellite orbit projections as well as expected traffic patterns and required path data capacities. Optimization can be performed based on these computations to select a particular pass through option that minimizes power consumption and data latency, while delivering required capacity and enhancing link reliability. In a further embodiment, individual transceiver subsystems can be operationally isolated. This, combined with data pass through inherently enhances overall resilience as subsystems that fail (i.e., FPGA, DSP, etc.) can be programmatically bypassed during their failure, reboots, etc., while still preserving data path connectivity.

Also, in other embodiments, the present disclosure relates to software programmable flexible and dynamic optical transceivers based on Field Programmable Gate Arrays (FPGAs). Advantageously, the optical transceivers enable a software-defined, flexible, dynamic fiber-optic network through pre-developed single-function, highly optimized Digital Signal Processing (DSP) processing blocks and applications (referred to herein DSP apps which can be FPGA bit files), combined with control plane software for controlling app storage and appropriate automated deployment. A key aspect includes replacing custom, hard-coded, pre-programmed ASIC implementations with FPGAs that are loaded with appropriate apps (bit files) as needed for specific applications, not a single ASIC with multiple modes. This achieves lower development costs as compared with ASIC implementations, the ability to sustain flexible, dynamic network reconfiguration with support for multiple operation modes, and provides ability to support future standards and modes as they are being developed.

Conventional optical transceivers, transponders, and modems (collectively referred to herein as "transceivers") for coherent optical transmission have a vast amount of digital functionality that is implemented in hard-coded, pre-programmed Application Specific Integrated Circuits (ASICs). The digital functionality can include, without limitation, modulation formats, dispersion compensation, Polarization Mode Dispersion (PMD) compensation, non-linear pre and/or post-compensation, Forward Error Correction (FEC), performance monitoring, and the like. An example of an optical transceiver with the digital functionality is Ciena Corporation's WaveLogic which supports a fully instrumented, intelligent photonic system with coherent optics and flexible line elements that combine with embedded and discrete software tools to offer superior automation, control, and visibility of optical networks. The associated ASICs are built to efficiently address any metro, regional, long-haul, submarine, or satellite application. Due to the large Non-Recurring Engineering (NRE) cost, generally low volumes (for networking applications relative to other applications with higher volumes such as consumer devices, etc.), and short product lifecycle, convention approaches have ASIC-based devices hard-coded, pre-programmed to support multiple modes, such as for any metro, regional, long-haul, submarine, or satellite application. As described herein, a mode is some digital functionality implemented in the optical transceiver. Thus, any transceiver used in one application would have all the functionality for the other applications, albeit disabled. Having multiple modes included therein takes up gates, power, and real estate on a Complementary Metal Oxide Semiconductor (CMOS) die. This contributes to a large size and extremely expensive masks. Additionally, hard-coded, pre-programmed implementations may be difficult to adapt to flexible, dynamic Software Defined Networking (SDN) networks. Further, hard-coded, pre-programmed implementations preclude future compatibility with the industry's definitions of interoperable and open transceiver interfaces.

Accordingly, in some embodiments, the present disclosure supports software programmable flexible and dynamic optical transceivers based in part on Field Programmable Gate Arrays (FPGAs) to overcome the aforementioned limitations in the hard-coded, pre-programmed implementations.

Example Satellite Optical Network

Figure 1B:
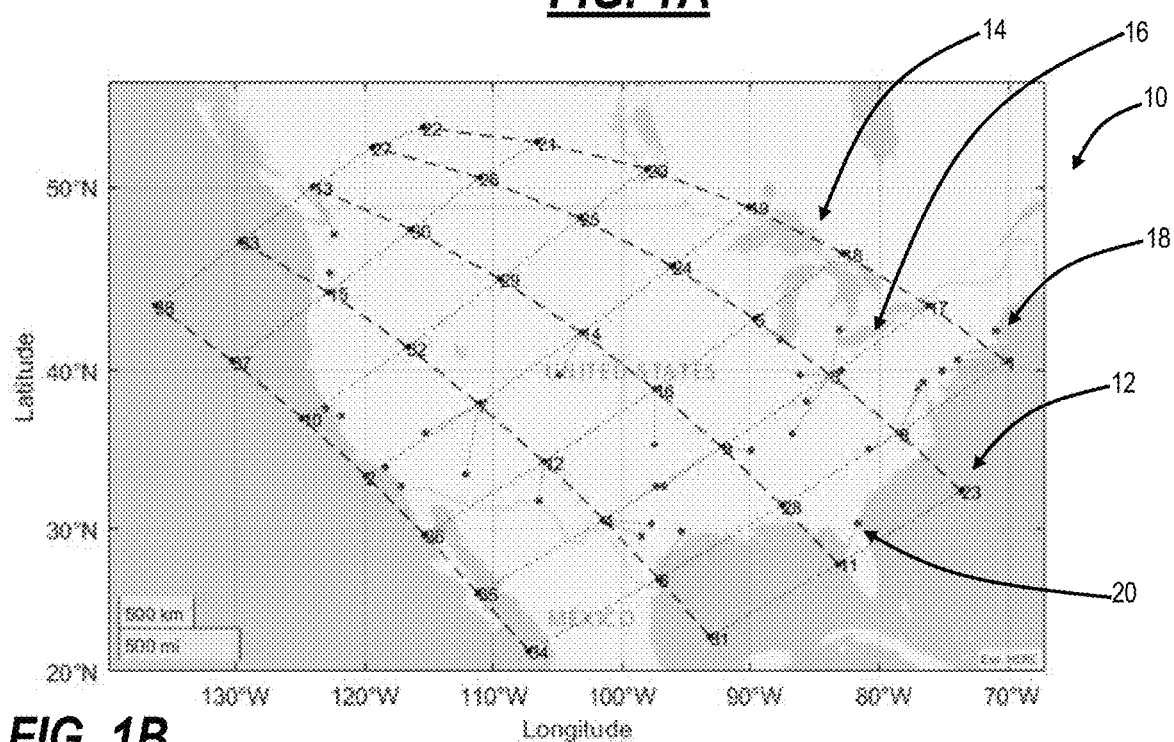
FIG. 1B is a map of the continental U.S. illustrating the LEO network of FIG. 1 including 30 most populous U.S. cities.

FIG. 1A is a map of the earth illustrating an example LEO network 10. FIG. 1B is a map of the continental U.S. illustrating the LEO network 10 including 30 most populous U.S. cities. For illustration purposes, the satellites in ascending orbits are shown as an example LEO MSS to provide Internet Access. The present disclosure contemplates various other LEO MSS as well as MEO MSS and GEO MSS, for use with the satellite optical transceiver described herein.

LEO MSS fly in formations including typically equally distanced satellites daisy-chained within separate orbital planes.

Each satellite includes multiple optical transceivers to form Inter-Satellite Communication (ISC links). ISC links can be established between the satellites in closest proximity by means of four modems: two for intra-plane Inter-Satellite Links (ISLs) and two for inter-plane ISLs. Circular orbital intra-plane ISLs together with inter-plane ISLs form a network whose mesh-grid topology is very similar to a 2D Torus with degree of 4. Of course, it is also possible for satellites to connect with other satellites besides their nearest adjacent neighbors since space links support long distances. For example, see U.S. patent application Ser. No. 17/401,416, filed Aug. 13, 2021, and entitled "Express mesh inter-satellite optical coherent networking," the contents of which are incorporated by reference in their entirety, The example constellation under analysis includes 66 satellites per each of 24 53°-inclined orbital planes. A snapshot of a local satellite network comprised of group of satellites in ascending orbits over the continental US is frozen in time and shown in FIG. 1B. In FIG. 1B, satellites 12 are dots. Dashed lines are intra-plane ISLs 14 and also indicate orbital planes, while dotted line are inter-plane ISLs 16, together illustrating a relevant mesh-grid portion of the satellite network 10. Dots are 30 most populous cities 18 in the U.S. Lines 20 indicate which satellite 12 is connected to which city 18, but are not necessarily physical links, i.e., they could represent terrestrial traffic aggregation to a single ground station hub. Only 16 out of 38 satellites are connected to the ground stations hubs and they are numbered 1 through 16 in accordance with the total population of the cities within the corresponding ground hub—from higher to lower—for the purpose of further analysis.

Figure 2:
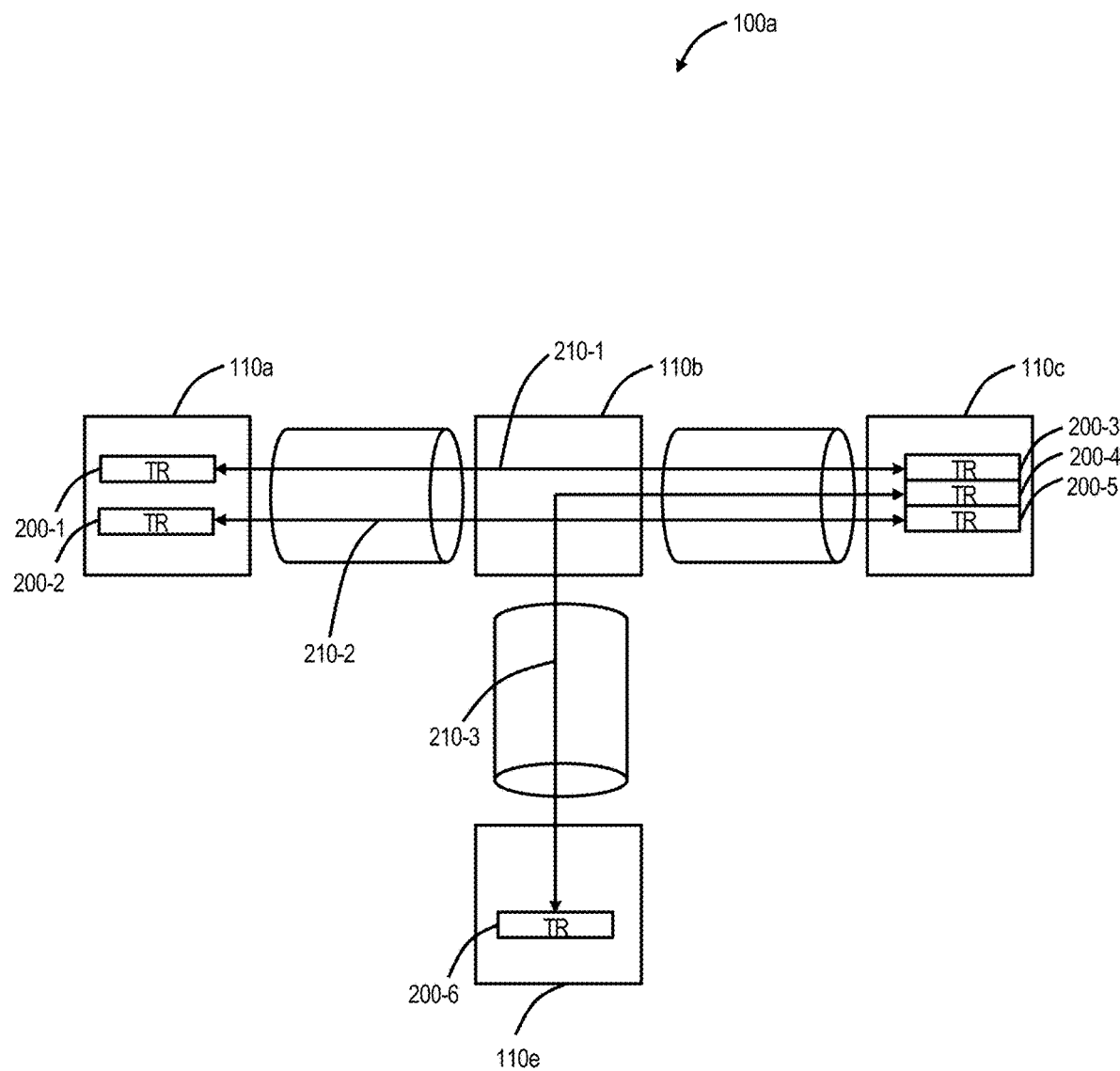
FIG. 2 is a logical network diagram of a subset of optical connectivity in the network of FIG. 1 showing the sites and three example wavelengths.

FIG. 2 is a logical network diagram of a subset of an optical network 100 showing satellites 110*a*, 110*b*, 110*c*, 110*e* and three example wavelengths 210-1, 210-2, 210-3. The wavelengths 210-1, 210-2 are between the satellites 110*a*, 110*c* with an express through at the site 110*b*, and the wavelength 210-3 is between the satellites 110*e*, 110*c* with an express through at the site 110*b*. The satellite 110*a* includes dynamic optical transceivers 200-1, 200-2, the satellite 110*c* includes dynamic optical transceivers 200-3, 200-4, 200-5, and the site 110*e* includes a dynamic optical transceiver 200-6. Thus, the wavelength 210-1 is formed by the dynamic optical transceivers 200-1, 200-3, the wavelength 210-2 is formed by the dynamic optical transceivers 200-2, 200-5, and the wavelength 210-3 is formed by the dynamic optical transceivers 200-6, 200-4. The various wavelengths 210-1, 210-2, 210-3 can carry any type of traffic such as, without limitation, OTN, SONET, SDH, Ethernet, Frame Relay, IP, MPLS, and the like as well of combinations thereof.

The links 120 can be in free space and can include any type of optical fiber. For example, the links 120 can transmit a useable optical spectrum of 1530 nm to 1565 nm (C-Band). Of course, other spectrums are contemplated. The optical spectrum can be partitioned into a flexible grid, a fixed grid, gridless, or a combination across the optical spectrum. Thus, each of the links 120 can support a fixed or variable number of wavelengths 210 (wavelengths can also be referred to as optical signals). The wavelengths 210 traverse a channel which carries an underlying service between two of the satellites 110 in the network. Each of the wavelengths 210 is formed by the dynamic optical transceivers at two sites 110 where the channel is added/dropped (or regenerated). Parameters associated with each of the wavelengths 210 can include-A-Z path in the network, spectrum allocation (e.g., fixed spectrum, flexible spectrum, amount of spectrum, location on the spectrum, etc.), modulation format, baud rate, FEC parameters, optical power, dispersion compensation, PMD compensation, non-linear compensation, etc.

Evolution of the Optical Network—Interoperability and Back Compatibility

One aspect which is a driver for the dynamic optical transceivers 200 over custom, hard-coded, pre-programmed ASIC implementations is interoperability and backward compatibility issues. The introduction of interoperable transponders is expected to increase the speed with which new transceiver models are introduced into the network. This is contrary to the design paradigm associated with custom, hard-coded, pre-programmed ASIC implementations. Internal company proprietary transceivers are also evolving quite fast, and models from different generations are generally not interoperable. Service providers and the like are pushing towards open transceiver specifications (such as the Open ROADM Multi-Source Agreement (MSA) which further requires interoperability and backward compatibility.

Flexible SDN programmable networks with Colorless/Directionless/Contentionless (CDC) Reconfigurable Optical Add/Drop Multiplexers (ROADMs) further assume that transceivers deployed throughout the network are interoperable. When origin or termination points change, transceivers at both ends must match. Otherwise, the whole premise for dynamically reconfigurable networks falls apart. This is yet another driver for the dynamic optical transceivers 200. If a flexible SDN programmable network is deployed and operationalized, it effectively blocks the introduction of new higher performance, lower cost, and power transceivers as they generally cannot interoperate with older ones.

Satellite networks place additional constraints of size, weight, and power consumption. Further, satellites are not physically accessible once in orbit and hardware replacement or modification is not possible. Any functional change, such as introducing transceiver support for newly developed protocols, modulation formats, forward error correction and the like must be done through remotely enabled software changes. Thus, software programmable transceivers become indispensable for satellite networks.

Evolution of the Optical Network—Sliceable, Bandwidth Variable Transceivers

Also, bandwidth variable transceivers are considered an essential component of next generation networks. They provide the flexibility of capacity optimized for specific reach, and of spectrum utilization optimized for a specific use pattern. ASIC-based transceivers have to build in support for all possible modes of operation, including changing Baud rate and changing bit rate. Chromatic dispersion filter depth increases as the product of Baud rate and bit rate. Thus, if either one is reduced, substantial savings in DSP complexity can be realized. Similarly, large constellation sizes (such as 64QAM) require much higher precision math operations compared to smaller constellations (such as 4QAM). Thus, constellation size is reduced, substantial savings in DSP complexity can be realized. Thus, the dynamic optical transceivers 200 can provide exactly what is needed for an application rather than a "one size fits all" approach.

Evolution of the Optical Network—Autonomous Transponders

Rapid network reconfiguration, especially one that supports multiple vendors in the SDN-type open and interoperable environment can benefit from autonomous transceivers. Autonomous transceivers such as the dynamic optical transceivers 200 have the capability to apply sophisticated algorithms independently to identify incoming signal characteristics, such as Baud rate, bit rate, constellation configuration, etc. This can serve as a replacement or a double-check on the controller and improve network reliability and resilience. Such blind format and channel recognition algorithms are quite complex, but are only required once at start up, but would consume significant resources on a DSP ASIC. The dynamic optical transceivers 200 can utilize an associated DSP app at start up and then disable or delete such an app, including storing it outside of FPGA in local memory which is accessible when needed.

Dynamic Optical Transceivers

Generally, the dynamic optical transceiver 200 is associated with the optical signal which is the result of modulating an electrical signal onto an optical carrier. That electrical signal may have a single carrier such as with a single Time Division Multiplexing (TDM) stream of Quadrature Phase Shift Keying (QPSK) symbols, a plurality of carriers such as with Nyquist Frequency-Division Multiplexing (FDM), or a very large number of carriers such as with Orthogonal Frequency-Division Multiplexing (OFDM). Any type of modulation scheme is contemplated.

In an embodiment, each dynamic optical transceiver 200 is tunable so that it can selectively generate a wavelength centered at the desired carrier wavelength (or frequency). In embodiments in which tunable dynamic optical transceivers 200 are used, the wavelength range of each dynamic optical transceiver 200 may be wide enough to enable the dynamic optical transceiver 200 to generate any wavelength in the optical spectrum. In other embodiments, the wavelength range of each dynamic optical transceiver 200 may be wide enough to enable the transceiver 200 to generate any one of a subset of wavelengths in the optical spectrum. The dynamic optical transceiver 200 may be configured to use any of duo-binary, quadrature amplitude modulation (QAM), differential phase shift keying (DPSK), differential quadrature phase shift keying (DQPSK), orthogonal frequency-division multiplexing (OFDM), polarization multiplexing with any of the foregoing, and any other type of coherent optical modulation and detection technique. It is understood that for electronic channel discrimination, a tunable Rx is required. In nQAM and nPSK it is achieved using a linear receiver, i.e., a receiver where frequency mixing is taking place between an optical local oscillator and the incoming signal. A Local Oscillator (LO) needs to be tuned to the right frequency such that the mixing product can be at baseband where all the necessary filtering will occur. If a receiver is not operating like above, it requires a tunable optical filter prior to the optical detector.

The dynamic optical transceivers 200 can support various baud rates through software-programmable modulation formats. The dynamic optical transceivers 200 can support programmable modulation or constellations with both varying phase and/or amplitude. In an embodiment, the dynamic optical transceivers 200 can support multiple coherent modulation formats such as, for example, i) dual-channel, dual polarization (DP) binary phase-shift keying (BPSK) for 100 G at submarine distances, ii) DP quadrature phase-shift keying (QPSK) for 100 G at ultra-long haul distances, iii) 16-quadrature amplitude modulation (QAM) for 200 G at metro to regional (600 km) distances), or iv) dual-channel 16QAM for 400 G at metro to regional distances. As described herein, in conventional optical transceivers, the same optical transceiver can support 100 G to 400 G due to the use of custom, hard-coded, pre-programmed ASIC implementations with multiple modes. However, with the dynamic optical transceivers 200, each dynamic optical transceiver 200 is loaded with DSP apps on associated FPGA hardware as appropriate for a single mode.

In another embodiment, the optical transceiver 200 can support N-QAM modulation formats with constellation shaping with and without dual-channel and dual-polarization where N can even be a real number and not necessarily an integer. Here, the optical transceiver 200 can support non-standard speeds since N can be an effective real number as opposed to an integer, i.e. not just 100 G, 200 G, or 400 G, but variable speeds, such as 130 G, 270 G, 560 G, etc. These rates could be integer multiples of 10 Gb/s, or of 1 Gb/s. Furthermore, with the DSP and software programming of the optical transceiver 200, the capacity of the optical transceiver 200 can be adjusted upwards or downwards in a flexible and hitless manner so as not to affect the guaranteed rate. In other embodiments, the optical transceiver 200 can include hardware which lacks the aforementioned functionality and thus supports a single modulation format/baud rate which cannot be adjusted (but other parameters that can be adjusted for power, spectrum location, etc.). Additionally, the optical transceiver 200 can tune and arbitrarily select spectrum; thus, no optical filters are required. Additionally, the optical transceiver 200 can support various aspects of nonlinear effect mitigation and dispersion compensation (both for chromatic and polarization mode) in the electrical domain via appropriate DSP apps, thus eliminating external dispersion compensation devices, filters, etc. The optical transceiver 200 can also adapt the forward error correction coding that is used including Hard Decision FEC implementations and Soft Decision FEC (SD-FEC), as another technique to trade-off complexity versus noise tolerance.

In general, the bit rate of the service provided by a transceiver is proportional to the amount of spectrum occupied and is a function of the noise tolerance. The optical transceiver 200 can include coherent receivers which require no optical dispersion compensation or optical filters (multiplexers and demultiplexers). Also, the optical transceiver 200 can support advanced Performance Monitoring (PMs) for feedback such as Bit Error Rate (BER), Polarization Dependent Loss (PDL), Polarization Mode Dispersion (PMD), and the like to provide accurate modeling of optical characteristics. The optical transceiver 200 can include coherent transmitters which can provide spectral shaping allowing for more efficient spectrum use and flexible grid placement. Also, the coherent transmitters support software-selectable modulation format, providing more bits/s/Hz.

Field Programmable Gate Arrays (FPGAs)

An FPGA is an integrated circuit designed to be configured by a customer or a designer after manufacturing, hence "field-programmable." The FPGA configuration is generally specified using a hardware description language (HDL), like that used for an ASIC. FPGAs contain an array of programmable logic blocks, and a hierarchy of reconfigurable interconnects that allow the blocks to be "wired together," like many logic gates that can be inter-wired in different configurations. Logic blocks can be configured to perform complex combinational functions or merely simple logic gates like AND and XOR. In most FPGAs, logic blocks also include memory elements, which may be simple flip-flops or complete blocks of memory.

Contemporary field-programmable gate arrays (FPGAs) have large resources of logic gates, look up tables, and RAM blocks to implement complex digital computations which are the DSP apps described herein. FPGAs can be used to implement any logical function that an ASIC could perform.

The ability to update the functionality after shipping, partial reconfiguration of a portion of the design and the low NRE costs relative to an ASIC design (notwithstanding the generally higher unit cost due to significantly lower volumes than FPGAs), offer advantages for the dynamic optical transceiver 200. The FPGAs can also have analog features in addition to digital functions. The analog features can include programmable slew rate on each output pin, oscillators, SERDES, analog-to-digital converters (ADCs) and digital-to-analog converters (DACs) with analog signal conditioning blocks.

A recent industry trend to disaggregating functions (i.e. SERDES, ADC, DAC, DSP, etc.) into separate die allows further improvements in optimizing individual functional performance, cost and power consumption. These functions can then be recombined and interconnected using high performance interposers and System-in-Package (SiP) packaging techniques.

Dynamic Optical Transceiver with FPGAs

Figure 3:
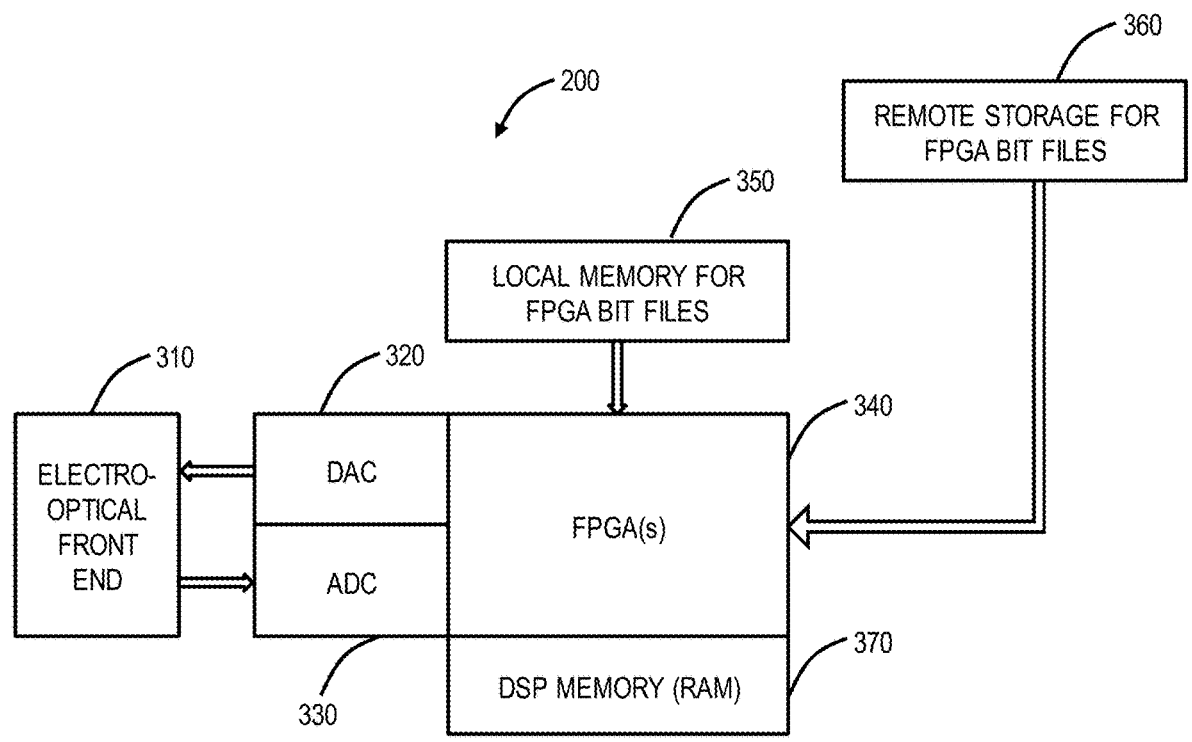
FIG. 3 is a block diagram of functional components of a dynamic optical transceiver utilizing FPGAs.

Referring to FIG. 3, in an embodiment, a block diagram illustrates functional components of the dynamic optical transceiver 200. The dynamic optical transceiver 200 is an integrated hardware device that may be realized as a line card, line module, pluggable module, blade, daughter board, etc. The integrated hardware device includes a form-factor for operation in or with the switches 122, the network elements 124 or the like. Functional components of the dynamic optical transceiver 200 include an electro-optical front end 310, a digital-to-analog converter (DAC) 320, an analog-to-digital converter (ADC) 330, one or more FPGAs 340, and local memory 350 for storing associated FPGA bit files for DSP apps. Additionally, a system that utilizes the dynamic optical transceiver 200 can also include remote storage 360 for FPGA bit files for remotely providing DSP apps to the dynamic optical transceiver 200. The dynamic optical transceiver 200 can also include local DSP memory 370 integrated with or communicatively coupled to the FPGA 340. The local DSP memory 370 can be DRAM or the like and can be used to store data for various functions associated with the FPGA 340 or the other components in the dynamic optical transceiver 200. The electro-optical front end 310 provides conversion between optical and electronic domains. The ADC 320 and the DAC 330 provide conversion between analog electrical signals and digital domain and are connected to the FPGAs 340 for digital signal processing functions. DRAM memory 370 provides storage for internal DSP functions. The FPGAs 340 are further connected to the local memory 350 for access to bit files (DSP apps) that are either frequently used or require low latency for fast start-up.

The electro-optical front end 310 includes a transmitter and a receiver. The transmitter generally includes a laser and a modulator. The transmitter is configured to receive a transmit signal from the DAC 320 in analog form to drive the modulator to transmit optically the transmit signal. The receiver can include various detectors, a local oscillator (LO), and polarization components. The receiver receives a receive signal optically, performs detection of an electrical signal, and provides an electrical analog signal to the ADC 330 for digital conversion thereof.

The FPGAs 340 are configured to utilize various DSP apps to program FPGA hardware to adapt signals to form the transmit signal which is digitally provided to the DAC 320 and decode the receive signal which is digitally provided from the ADC 330. In some embodiments, the DAC 320 and the ADC 330 are formed with the FPGAs 340 and in other embodiments, the DAC 320 and the ADC 330 are separate from the FPGAs 340. With the FPGAs 340, a fiber-optic network control plane or SDN controller is supplied with a set of pre-developed DSP firmware bit files (DSPs apps) that implement single-function and highly optimized DSP code (DSP apps). Again, these are provided to the FPGAs 340 via either the local memory 350, the remote storage 360, or via the local memory 350 from the remote storage 360. Depending on the requested operation mode change, the control plane or SDN controller would determine which DSP apps need to be dynamically loaded into the FPGAs 340, how to pre-load local and remote memories, etc. thereby providing real-time control and configuration. For example, an autonomous signal identification app may be located in the local memory 350. The remote memory 360 is also provided for storing bit files (DSP apps) that are infrequently used and can tolerate loading delays, such as apps related to a specific operating mode which is used at start-up. Also, the local DSP memory 370 can be used to store data for various functions associated with the FPGA 340 or the other components in the dynamic optical transceiver 200, such as signal capture for a blind channel identification function, filter parameters for a dispersion compensation function, or the like.

Currently, there is a fortunate confluence of several technologies which enable the dynamic optical transceiver 200. First, the FPGAs 340 are becoming quite large. Second, advanced interposer technologies enable placement of multiple FPGA chips in close proximity, and further coupling other functions such as the ADC 330, the DAC 320, and the memory 350 across very dense low-power interfaces.

Given the trajectory of the FPGA 340 performance improvement, the highly performant algorithms of the DSP apps fit into the implementation. As an example, chromatic dispersion (CD) compensation is one of the largest functional blocks. An example of an FPGA-based CD compensation technique is described in commonly assigned U.S. Pat. No. 8,884,649 issued Nov. 11, 2014, and entitled "SYSTEM AND METHOD FOR STATIONARY FINITE IMPULSE RESPONSE FILTERS IN PROGRAMMABLE MICROELECTRONIC CIRCUITS," the contents of which are incorporated by reference. This has been implemented in a Xilinx Virtex-7 FPGA covering 2000 km using less than 30% of the FPGA 340 resources.

The other large block is an FEC decoder. It is possible that some highly complex soft-decision decoders may not fit into an FPGA implementation of reasonable size. However, the same codes may usually be decoded using efficient hard-decision approaches, albeit at some coding gain penalty. Further, industry standards for interoperable transceivers are focused exclusively on compact hard decision decoders. There are also efficient implementations for other functional blocks, such as polarization tracking, PMD compensation, clock, and carrier frequency recovery, etc. Again, as described herein, the functional blocks are realized based on DSP apps (bit files) which describe the appropriate FPGA configuration for the functional blocks.

The DSP apps, i.e., the bit files, may also be partitioned into smaller functional blocks, such that only blocks that are different between operating modes may be replaced. Also, even smaller DSP app chunks are contemplated, such as a Fast Fourier Transform (FFT) app, an Inverse FFT (IFFT) app, etc. Precise partitioning depends on the FPGA 340 capability and dynamic optical transceiver 200 architecture.

For example, a transceiver 200 that just entered auto start mode can be loaded with an image that provides data capture, automatic baud rate and modulation format identification, and identification of major channel parameters such as accumulated chromatic dispersion. Once done, the start-up image is removed and an image appropriate for the modulation and channel characteristics can be loaded.

Another example may be when a transceiver 200 is requested to switch between a mode proprietary to a vendor implementation to one compatible with a standard specification. The switch may be made by switching the decoding block to differential detection, removing cycle slip identification, replacing FEC with compatible encoder and decoder blocks, etc.

A final example may be a transceiver 200 that is requested to switch from a high bit rate (e.g., 32QAM), short work path to a much longer optical protection path that can only operate at a lower bit rate (e.g., 4QAM). Such a change may be the result of a protection switch. In this case, most of the front-end DSP processing can be replaced with bit files supporting processing with lower resolution math, but possibly requiring a much longer chromatic dispersion filter and the FEC block may stay the same.

Of course, those of ordinary skill in the art will recognize there are various examples and combinations of FPGA 340 configuration for any application of the dynamic optical transceivers 200 ranging from extremely short-reach Data Center interconnection applications, to metro network deployments (e.g., up to 80 km), to regional network deployments (e.g., 80-300 km), to long-haul (e.g., up to 2000 km and beyond), and up to submarine deployments. Further, the FPGA 340 can include applications for space deployment in satellites.

With respect to the FPGAs 340, the cost per transistor has recently inverted (i.e., smaller CMOS nodes are actually more expensive per transistor than older larger nodes), which makes low volume ASIC production even more problematic going forward. At the same time, FPGAs are high volume, generic devices, and plans for scaling down to 7 nm node are already under way. The current semiconductor industry model is moving away from highly integrated single die devices, and more into disaggregated functions on separate high-performance die. Sophisticated interposer-based packaging overcomes cost issues and provides high bandwidth low power interconnect capability. Also, integration of high-performance DAC 320 and ADC 330 functions with a programmable FPGA 340 backend is enabled by high-performance interposers and low power digital interfaces. The continued FPGA 340, ADC 330, and DAC 320 evolution will allow increasing support, but will still provide full back compatibility to deployed transceivers 200 through separately downloadable images. Spectral sliced bandwidth variable transceivers 200 can be more optimally supported by having DSP images tailored to a specific format. The savings should be particularly large when the transceiver 200 is operating at both lower Baud rate and lower bit rate.

Dynamic Optical Transceiver with Both FPGAs and DSP ASICs

Figure 4:
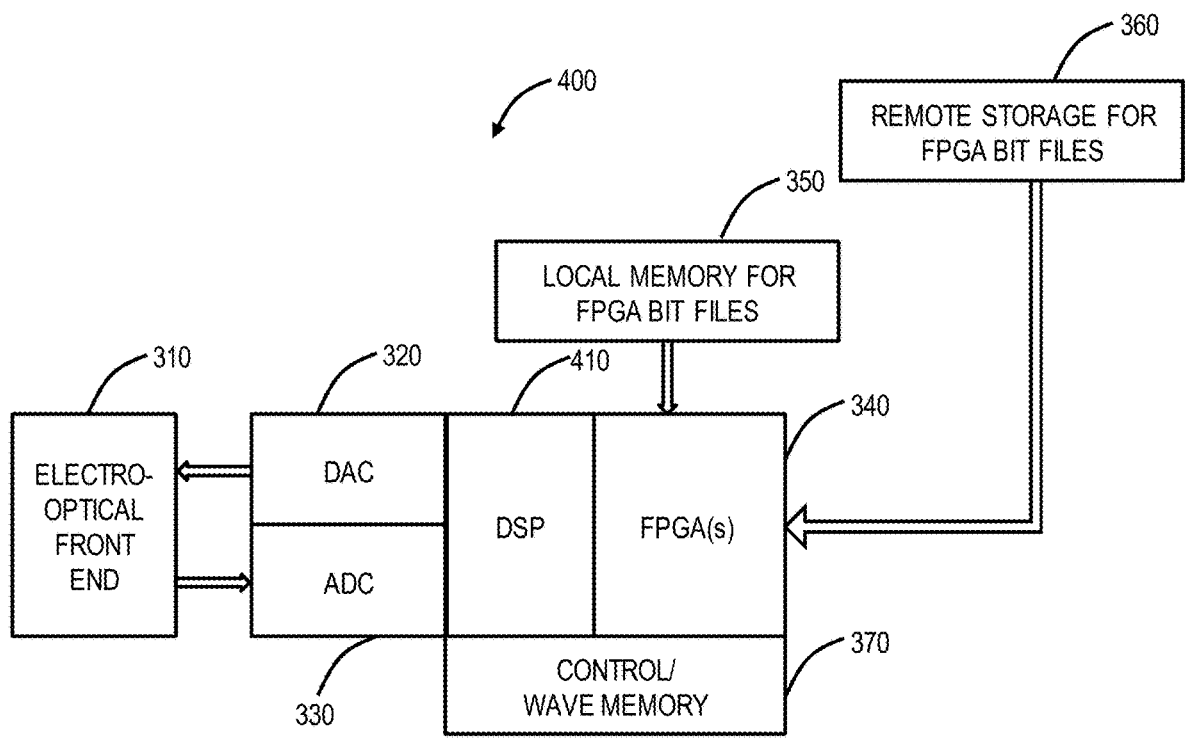
FIG. 4 is a block diagram of functional components of a dynamic optical transceiver, similar to the dynamic optical transceiver of FIG. 3, but which includes both FPGAs and a DSP.

Referring to FIG. 4, in an embodiment, a block diagram illustrates functional components of a dynamic optical transceiver 400 which includes both the FPGAs 340 and a DSP 410. The dynamic optical transceiver 400 is similar in function and use as the dynamic optical transceiver 200 but includes both FPGAs 340 and a DSP 410. As described herein, the DSP can also be a DSP ASIC, i.e., a purpose-build ASIC for DSP functions or applications. Specifically, some DSP applications are more advantageous to run on an ASIC or DSP while others on the FPGAs 340. For example, a DSP ASIC provides basic mapping between digital bits and "analog constellation" domains. The DSP ASIC could include ADC/DAC, RF filtering, frequency/phase and clock recovery, and mapping constellation into log-likelihood (LLR) data on RX side. TX side would map digital data into constellation analog representation. The FPGAs 340 can provide FEC including soft-decision decoding based on LLR, de/interleaving, framing, possible en/decryption, etc. Now, in principle all computations could be done in the FPGA avoiding the ASIC DSP completely, but that would be an inefficient implementation.

Of note, the FPGAs 340 can be used for DSP applications that require programmability whereas the DSP 410 can be used for modulation/demodulation functions more efficiently.

Software Programmable Optical Transceiver Embodiments

In an embodiment, an optical transceiver includes an electro-optic front end; a digital-to-analog converter (DAC) and an analog-to-digital converter (ADC) connected to the electro-optic front end; and one or more Field Programmable Gate Arrays (FPGAs) connected to the DAC and the ADC, wherein the one or more FPGAs are connected to one or more of a local memory and a remote storage for loading FPGA bit files, and wherein the one or more FPGAs are loaded with a forward error correction (FEC) encoding app and a FEC decoding app. The FEC encoding app and the FEC decoding app can be selected based on any of an optical application and a standard compliance requirement. The optical application can be based on distance. The FEC decoding app can be one of hard decision and soft decision. The one or more FPGAs can be loaded with a signal interleaving/deinterleaving app for use with the FEC encoding app and the FEC decoding app. The one or more FPGAs can be loaded with an encryption and key management app for encrypting and decrypting a signal. The one or more FPGAs can be loaded with a training sequence insertion and detection app for training a transmitter and optimizing a receiver. The one or more FPGAs can be loaded with a framing app for framing and de-framing with overhead according to a standardized framing technique. The one or more FPGAs can be loaded with a packet processing app. The one or more FPGAs can be loaded with a pseudorandom binary sequence (PRBS) app for generation of testing sequences.

In an embodiment, a storage system includes a connection to one or more optical transceivers, each having one or more Field Programmable Gate Arrays (FPGAs); and a processor and memory storing instructions that, when executed, cause the processor to receive a request for one or more applications for a specific optical transceiver of the one or more optical transceivers, and provide the one or more applications to the specific optical transceiver, wherein the one or more applications are utilized in the specific optical transceiver to dynamically configure digital functionality in its one or more FPGAs for operation in an optical network. The storage system can be a remote storage connected to each of the one or more optical transceivers and wherein each of the one or more optical transceivers can include a local memory. The local memory can be for frequently used functionality and/or functionality that meets a requirement of low latency for fast startup, and the remote storage can be for one or more of infrequently used functionality and functionality that has a tolerance to loading delays. The local memory can include applications for data capture, automatic baud rate and modulation format identification, and identification of channel operating parameters for start-up. The remote storage can include applications for modulation and the channel operating parameters, based on the automatic baud rate and modulation format identification and the identification of channel operating parameters. The one or more applications can be FPGA bit files adapted to configure the one or more FPGAs.

The one or more applications can be each for an associated operation mode including one of Data Center interconnect, metro, regional, long-haul, submarine, and satellite, each operating mode having different distance characteristics requiring specialized processing for the digital functionality. The one or more applications can include a plurality of proprietary applications for single vendor interoperability and a plurality of standards-based applications for multi-vendor interoperability. The request for the one or more applications can be made by the specific optical transceiver, in response to a protection switch causing different operating conditions. The one or more applications can be loaded to the one or more FPGAs through one or more of a control plane and a Software Defined Network (SDN) controller. The one or more applications can support the digital functionality associated with optical signal compensation including one or more of Forward Error Correction (FEC), dispersion compensation, Polarization Mode Dispersion (PMD), and non-linear effect compensation.

In another embodiment, a method includes communicating to one or more optical transceivers, each having one or more Field Programmable Gate Arrays (FPGAs); receiving a request for one or more applications for a specific optical transceiver of the one or more optical transceivers, and providing the one or more applications to the specific optical transceiver, wherein the one or more applications are utilized in the specific optical transceiver to dynamically configure digital functionality in its one or more FPGAs for operation in an optical network. In a further embodiment, a non-transitory computer-readable medium comprising instructions that, when executed, cause a processor to perform steps of communicating to one or more optical transceivers, each having one or more Field Programmable Gate Arrays (FPGAs); receiving a request for one or more applications for a specific optical transceiver of the one or more optical transceivers, and providing the one or more applications to the specific optical transceiver, wherein the one or more applications are utilized in the specific optical transceiver to dynamically configure digital functionality in its one or more FPGAs for operation in an optical network.

In an embodiment, a software programmable optical transceiver includes one or more Field Programmable Gate Arrays (FPGAs); and an electro-optical front end communicatively coupled to the one or more FPGAs, wherein the electro-optical front end includes a transmitter and a receiver, wherein the transmitter is adapted to transmit a transmit signal from the one or more FPGAs and the receiver is adapted to receive a receive signal and provide the receive signal to the one or more FPGAs, wherein one or more applications are utilized to dynamically configure the one or more FPGAs for digital functionality to operate the software programmable optical transceiver in an associated mode. The one or more applications can be loaded as needed to configure the software programmable optical transceiver in the associated mode, without requiring pre-programmed hardware in the software programmable optical transceiver for operation in a plurality of operating modes. The one or more applications can be FPGA bit files adapted to configure the one or more FPGAs. The one or more applications can be loaded from one of a local memory in the software programmable optical transceiver and remote storage communicatively coupled to the software programmable optical transceiver. The one or more applications in the local memory can be for one or more of frequently used functionality and a requirement of low latency for fast startup, and wherein the one or more applications in the remote storage can be for one or more of infrequently used functionality and tolerance to loading delays.

When the software programmable optical transceiver is in a startup mode, the one or more applications can include data capture, automatic baud rate and modulation format identification, and identification of channel operating parameters, and, subsequent to the startup mode, the one or more applications can include an appropriate application for modulation and the channel operating parameters, based on the automatic baud rate and modulation format identification and the identification of channel operating parameters. The associated mode can be based on an associated application including one of Data Center interconnect, metro, regional, long-haul, submarine, and satellite. The one or more applications can include a plurality of proprietary applications for single vendor interoperability and a plurality of standards-based applications for multi-vendor interoperability. The one or more FPGAs can be updated with different applications of the one or more applications responsive to a protection switch causing different operating conditions. The software programmable optical transceiver can further include, between the one or more FPGAs and the electro-optical front end: a digital-to-analog converter (DAC) adapted to receive digitally the transmit signal from the one or more FPGAs; and an analog-to-digital converter (ADC) adapted to transmit digitally the receive signal to the one or more FPGAs. The DAC and the ADC can be integrated with the one or more FPGAs via interposers and low power digital interfaces. The one or more applications can be loaded to the one or more FPGAs through based on control through one or more of a control plane and a Software Defined Network (SDN) controller. The electro-optical front end can utilize coherent modulation and demodulation, and the one or more applications can support the digital functionality associated with the coherent modulation and demodulation. The one or more applications can support the digital functionality associated with optical signal compensation including one or more of Forward Error Correction (FEC), dispersion compensation, Polarization Mode Dispersion (PMD), and non-linear effect compensation.

In another embodiment, a software programmable optical transceiver includes an electro-optical front end for conversion between an optical domain and an electrical domain; a digital-to-analog converter (DAC) and an analog-to-digital converter (ADC) for conversion between analog electrical signals and digital electrical signal; and one or more Field Programmable Gate Arrays (FPGAs) for digital signal processing functions, wherein one or more applications are utilized to dynamically configure the one or more FPGAs for the digital signal processing functions to operate the software programmable optical transceiver in an associated mode. The one or more applications can be loaded as needed to configure the software programmable optical transceiver in the associated mode, without requiring pre-programmed hardware in the software programmable optical transceiver for operation in a plurality of operating modes. When the software programmable optical transceiver is in a startup mode, the one or more applications can include data capture, automatic baud rate and modulation format identification, and identification of channel operating parameters, and, subsequent to the startup mode, the one or more applications an include an appropriate application for modulation and the channel operating parameters, based on the automatic baud rate and modulation format identification and the identification of channel operating parameters.

In a further embodiment, a method implemented through a software programmable optical transceiver including one or more Field Programmable Gate Arrays (FPGAs) includes, responsive to a startup mode, loading one or more applications including data capture, automatic baud rate and modulation format identification, and identification of channel operating parameters into the one or more FPGAs; and, subsequent to the startup mode, loading appropriate applications into the one or more FPGAs for modulation and the channel operating parameters, based on the automatic baud rate and modulation format identification and the identification of channel operating parameters. The one or more applications can be loaded as needed to configure the software programmable optical transceiver in the associated mode, without requiring pre-programmed hardware in the software programmable optical transceiver for operation in a plurality of operating modes. When the software programmable optical transceiver is in the startup mode, the one or more applications can include data capture, automatic baud rate and modulation format identification, and identification of channel operating parameters, and, subsequent to the startup mode, the appropriate applications can include applications for modulation and the channel operating parameters, based on the automatic baud rate and modulation format identification and the identification of channel operating parameters.

DSP Applications

The following is a non-limiting list of possible DSP applications that can be loaded on the dynamic optical transceiver 200. Note, the FPGAs 340 can utilize multiple applications in various configurations as needed. It is expected that the transceivers 200 will also include management tools for loading the DSP apps from the local memory 350 and the remote storage 360, in the proper order and configuration. Also, each of the following DSP applications could have different variants for different applications such as data center, metro, regional, long-haul, submarine, and satellite applications.

The present disclosure also includes these DSP applications in purpose-built ASICs or DSPs, in combination with the FPGAs 340.

| App | Functionality |
| --- | --- |
| FEC encoding in FPGA | FPGA configuration to provide encoding of FEC on a signal. There can be multiple apps for different FEC schemes, where a specific FEC scheme is selected based on the optical application or standard compliance requirement. For example, submarine applications may use stronger FEC codes than metro applications, etc. Some standards may require codes such as Reed-Solomon or Low-Density Parity Check (LDPC), etc. For satellite application, it would likely be Digital Video Broadcasting - Satellite - Second Generation (DVB-S2) LDPC coding. Having the FEC in the FPGA allows reprogramability with other codes, |

-continued

| App | Functionality |
| --- | --- |
| FEC decoding in FPGA | FPGA configuration to provide decoding of FEC on a signal. A decoding scheme has to be matched to the encoding. Further, different decoders may be applied to the same encoding scheme. For example, decoders could be hard or soft decision, etc. |
| Signal Interleaving/Deinterleaving in FPGA | This function is used to provide improved resilience and immunity to correlated block errors. If the channel errors corrupt multiple consecutive bits, receiver based de-interleaver randomizes their distribution before FEC decoding. |
| Encryption and Key Management in FPGA | Data can be encrypted prior to transmission and decrypted on reception. Corresponding key management functions must be provided. En/decryption is performed on payload digital data, while generally keeping Framing overhead bits and FEC encoding untouched. It thus sits between Client and FEC and will have to reside in FPGA. |
| Training Sequence Insertion and Detection | Transmitted signal demodulation robustness can be improved by the periodic insertion of known training sequences to the transmitted signal. Receiver then checks and optimizes its demodulation/decoding algorithm operation against these known sequences. |
| Performance Monitoring | Variously listed blocks can provide channel condition, impairment and noise information that can be valuable to the end user. This information can be collected, aggregated, and made available to the user through a User Interface. The computation of channel parameters will likely have to be done in the DSP, where these are mitigated and corrected. |
| User Interface | Supports protocols for exchanging information with the user, including configuration, performance, channel conditions, etc. This is likely done in a CPU, but could be in the FPGA, including an ARM-based processor usually included in FPGAs. |
| Chromatic Dispersion equalization - best in DSP ASIC | FPGA configuration to provide chromatic dispersion compensation including filtering such as Finite Impulse Response (FIR) filters to adaptively equalize a signal. |
| PMD equalization - best in DSP ASIC | FPGA configuration to provide electrical domain filtering of polarization dependent transients. |
| Modulation format | FPGA configuration for implementing a coherent modulation scheme to process received signal for proper modulation of the electro-optical front end. This can be split between the FPGA and the DSP ASIC - DSP does basic mapping of incoming ADC samples into a GVD/PMD/Polarization compensated set of constellation samples. FPGA decodes constellation samples into data bits using Soft-Decision FEC for example based on specific constellation distribution, which can be QAM or probabilistically shaped. |
| Non-linear compensation | FPGA configuration for non-linear effect compensation in the electrical domain, including Cross-Phase Modulation (XPM), Self-Phase Modulation (SPM), Four-Wave Mixing (FWM), cross-talk, etc. can be performed via pre-distortion, post-distortion, or pre and post-distortion in combination. This can be split between the FPGA and the DSP ASIC. |
| Spectral slicing | FPGA configuration for electrical domain implementations of spectral slicing. |
| Framing in FPGA | FPGA configuration to implement signal framing/de-framing with overhead on a signal. The framing can include proprietary vendor-specific framing as well as any standardized framing technique such as OTN, SONET, SDH, Ethernet, etc. |
| Coherent Detection | FPGA configuration to compute decision variables based on recovery of a full electric field with amplitude and phase information. |
| De-skew and orthonormalization - best in DSP ASIC | FPGA configuration for alignment of in-phase and quadrature components or polarized channel components and ensuring independence or decorrelation between channels. |
| Timing recovery - best in DSP ASIC | FPGA configuration for recovery timing from a signal. |
| Frequency estimation - best in DSP ASIC | FPGA configuration for estimating frequency from a signal. |
| Carrier phase estimation and correction - best in DSP ASIC | FPGA configuration to track carrier phase on a signal and correct accordingly. |

-continued

| App | Functionality |
| --- | --- |
| Symbol estimation and decoding | FPGA configuration to estimate and decode symbols on a signal. |
| Packet processing in FPGA | FPGA configuration to perform any level of packet processing in the dynamic optical transceiver. |
| Performance monitoring | FPGA configuration to perform PM monitoring between adjacent dynamic optical transceivers. The PM scheme can be standards-based and/or proprietary. This can be split between the FPGA and the DSP ASIC. The channel estimation would most likely come from DSP, but some PM for data, FEC, etc, would come from FPGA. |
| PRBS generation in FPGA | FPGA configuration to provide pseudorandom binary sequence (PRBS) generation for testing, etc. |
| Filtering | FPGA configuration to provide any type of electrical domain filtering. These apps can be finer granularity and used with any of these other apps described herein. This can be similar to modulation format. |
| Integrated ADC/DAC | FPGA configuration for integrated ADC/DAC. For example, the configuration table could be stored in the FPGA. |
| MLSE in FPGA | FPGA configuration to implement Maximum likelihood sequence estimation (MLSE). |
| Blind recovery | FPGA configuration to implement blind signal recovery between two dynamic optical transceivers. This can be similar to modulation format. |
| Channel recognition | FPGA configuration to recognize a channel (modulation format, bit rate, baud rate, etc.) between two dynamic optical transceivers. This can be similar to modulation format. |
| SERDES in FPGA | FPGA configuration to implement Serializer/Deserializer (SERDES) functionality in the dynamic optical transceivers. |
| Carrier synchronization | FPGA configuration for a Feed Forward (FF) carrier synchronization to estimate carrier phase. This can be similar to modulation format. |
| IFFT/FFT | FPGA configuration for a much finer granular application to perform a specific Inverse Fast Fourier Transfer (IFFT) and FFT. This may be used in any of the above. This can be similar to modulation format. |

Conventional Transceiver Implementations

Currently, optical transceivers fall into one of the following configurations:

(1) individual, single wavelength transceivers, with all functions in separable physical modules, e.g., sleds, modules defined by Multi-Source Agreements (MSAs), pluggable optical modules such as CFP, QSFP, etc.

(2) multiple transceivers aggregated into a single package, but with separable functions, such as dual-wavelength coherent transceivers.

(3) multi-channel client direct-detect transceivers such as DR4 (4 fiber-pair) and FR4 (1 fiber-pair) implementations, and the like.

Of note, these configurations have completely separate signal paths and do not provide any internal signal cross-connect functionality. Currently, transceiver subsystem failures or reboots lead to complete loss of data connectivity until full data path functionality is restored. This makes sense as the use case is interconnect between two network devices which can include switching circuitry.

Satellite Applications

One application for coherent optical transceivers, such as the dynamic optical transceiver 200, 400, can include deployment in satellites for intersatellite communication as well as for ground station communication.

Proliferation of Multi-Satellite Systems (MSS) in both GEO (Geostationary Earth Orbit), MEO (Middle Earth Orbit) and LEO (Low Earth Orbit) has expanded personal voice and data communications and Internet in space. A satellite constellation is a group of artificial satellites working together as a system. Unlike a single satellite, a constellation can provide permanent global or near-global coverage, such that at any time everywhere on Earth at least one satellite is visible. Satellites are typically placed in sets of complementary orbital planes and connect to globally distributed ground stations. They may also use Inter-Satellite Communications (ISC). LEO MSS fly in formations including equally distanced satellites daisy-chained within separate orbital planes. Inter-Satellite Communications (ISC) are established by means of Inter-Satellite Links (ISL), which are distinguished as intra-plane (i.e., within a single orbit) and inter-plane (i.e., cross-orbit).

Coherent Transceiver Functionality

Coherent optical transceivers utilize Digital Signal Processing (DSP) to support programmable modulation, or modulation formats with both varying phase and/or amplitude to enable 100 Gb/s, 200 Gb/s, 400 Gb/s, 600 Gb/s, 800 Gb/s and beyond to meet the ever-growing network demand. The transceivers can support multiple coherent modulation formats such as, for example, i) Dual-Polarization (DP) Binary Phase-Shift Keying (BPSK), ii) DP Quadrature Phase-Shift Keying (QPSK), iii) DP 16-Quadrature Amplitude Modulation (QAM), iv) DP 64QAM, and the like. With associated DSP blocks in the transceiver hardware, moving from modulation formats can be software programmable. Also, the transceivers can support dual polarization, such as Polarization Multiplexing (X/Y or Horizontal/Vertical). Transceivers can support different transmit and receive carrier wavelengths to improve isolation. Transceivers can also adapt the FEC coding that is used, as another method to trade-off service rate vs. noise tolerance.

Observations

The present disclosure includes various approaches to address the unique environment of satellite optical interconnected transceivers.

Space links scale very differently from fiber links. For fiber, two concatenated 30 dB fibers add to 60 dB. For space, two concatenated 30 dB links add to 36 dB (i.e., free-space loss scales as $R^2$). Thus, space links can extend much farther than terrestrial fiber links.

Space links are Amplified Spontaneous Emission (ASE)-limited by the pre-amplifier, and coherent receivers have much better sensitivity especially for higher cardinality constellations, compared to direct-detect receivers. It is also more power-efficient to optically amplify the weak incoming signal than provide a very high-power Local Oscillator (LO).

Coherent DSP allows dynamic adaptation to match capacity to link reach at the lowest power consumption.

An example of a mesh interconnection scheme for satellites using optical transceivers is described in commonly assigned U.S. patent application Ser. No. 17/401,416, filed Aug. 13, 2021, and entitled "Express mesh intersatellite optical coherent networking," the contents of which are incorporated by reference in their entirety.

Figure 5A:
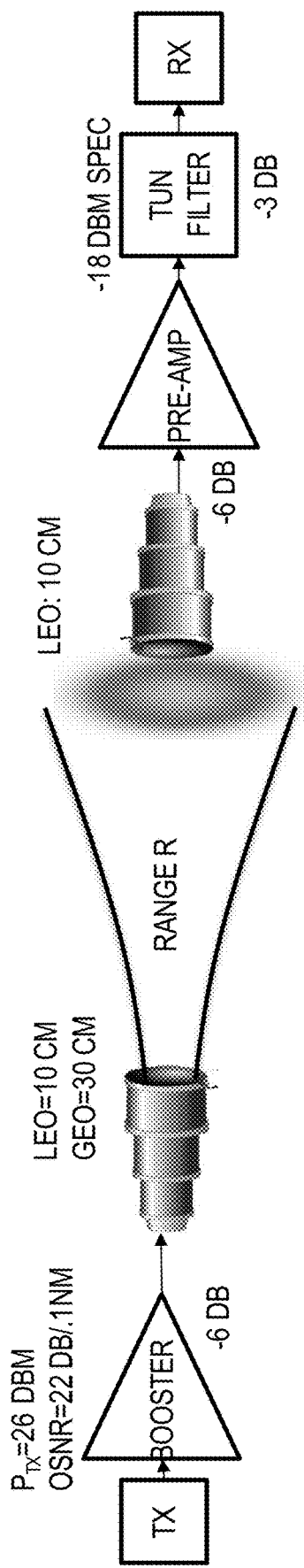
FIG. 5A is a diagram of an optical link in space.

FIG. 5A is a diagram of an optical link in space. Specifically, FIG. 5A illustrates the baseline link and estimated link budgets. Typically, an optical link in space includes a transmitter connected to a booster amplifier that connects to a telescoping lens. At the far end, a telescoping lens receives the signal, over the range R, provides the signal to a pre-amplifier which connects to a tunable filter and then the receiver. The telescoping lens can include a different diameter, e.g., 10 cm, 30 cm, etc., based on the application. Performance is acceptable with OFEC for DP-QPSK at 2500 and 5000 km and DPSK at 45000 km.

The following table includes example configuration values.

| Parameter | LEO 100 Gb/ 2500 km | LEO 25 Gb/ 5000 km | GEO 1 Gb/ 45000 km |
| --- | --- | --- | --- |
| $P_{boost}$ (dBm) | 26 | 26 | 26 |
| Free Space Loss (dB) | −53.9 | −59.9 | −79 |
| $P_{rx}$ into pre-amp (dBm) | −39.9 | −45.9 | −65 |
| G for pre-amp to get −18 dBm (dB) | 21.2 | 27.9 | 37.5 |
| OSNR (dual-pol ASE, dB/.1 nm) | 12.6 | 6.98 | −2.5 |
| Full-band 'flat' ASE power at −18 dBm signal (dBm) | −5 | 0.5 | 10 |

Optical link budgets in space have good margin, i.e., sufficient margin to allow data signal pass-through without full decoding, regeneration, error correction, etc. thereby saving considerable power.

Figure 5B:
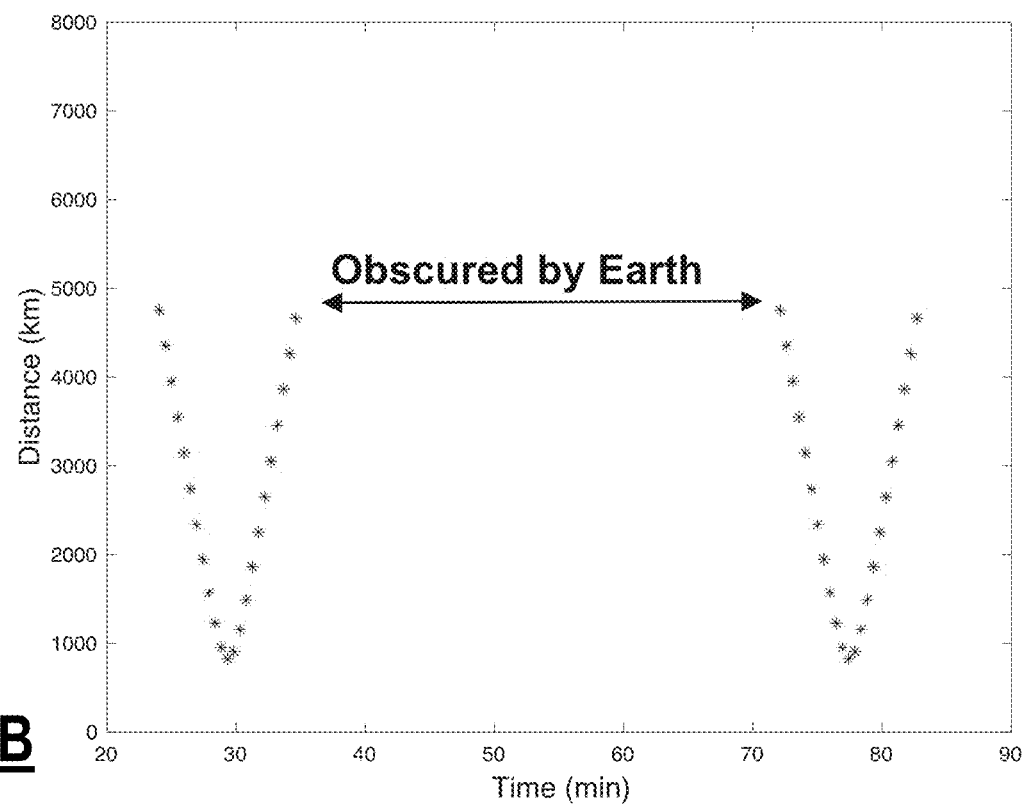
FIGS. 5B-5D are optical link parameters as a function of orbit time, with FIG. 5B illustrating distance between satellites, FIG. 5C illustrating OSNR at a receiver, and FIG. 5D illustrating supported data rate of a 400ZR transceiver.
Figure 5C:
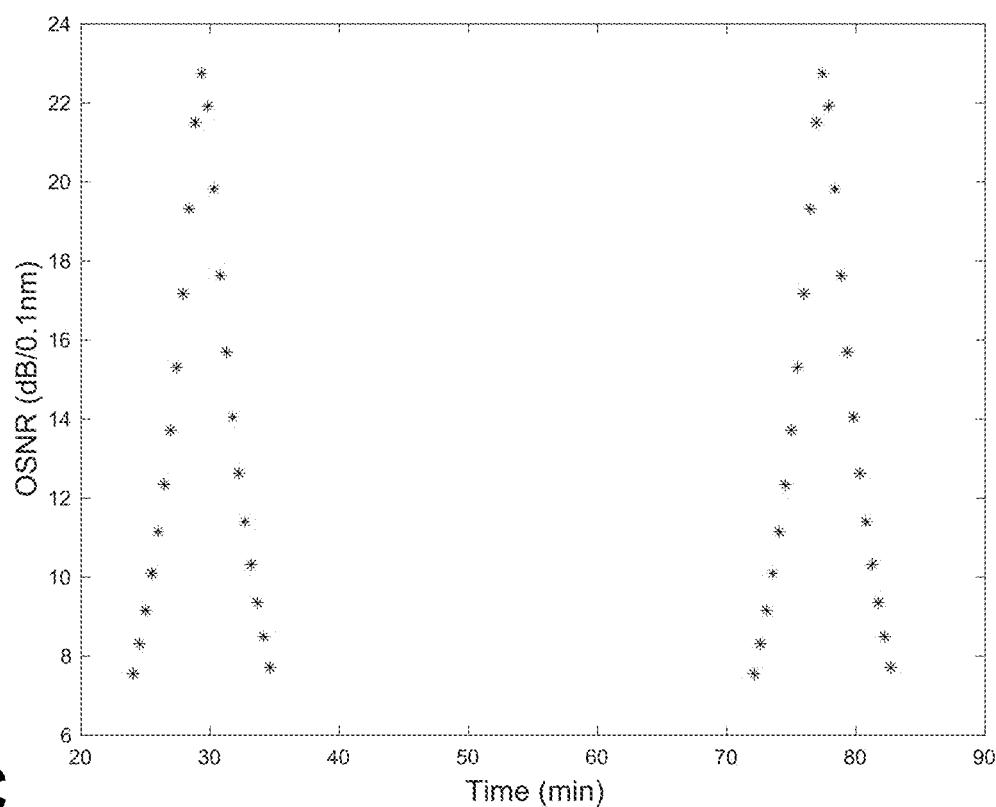
Figure 5D:
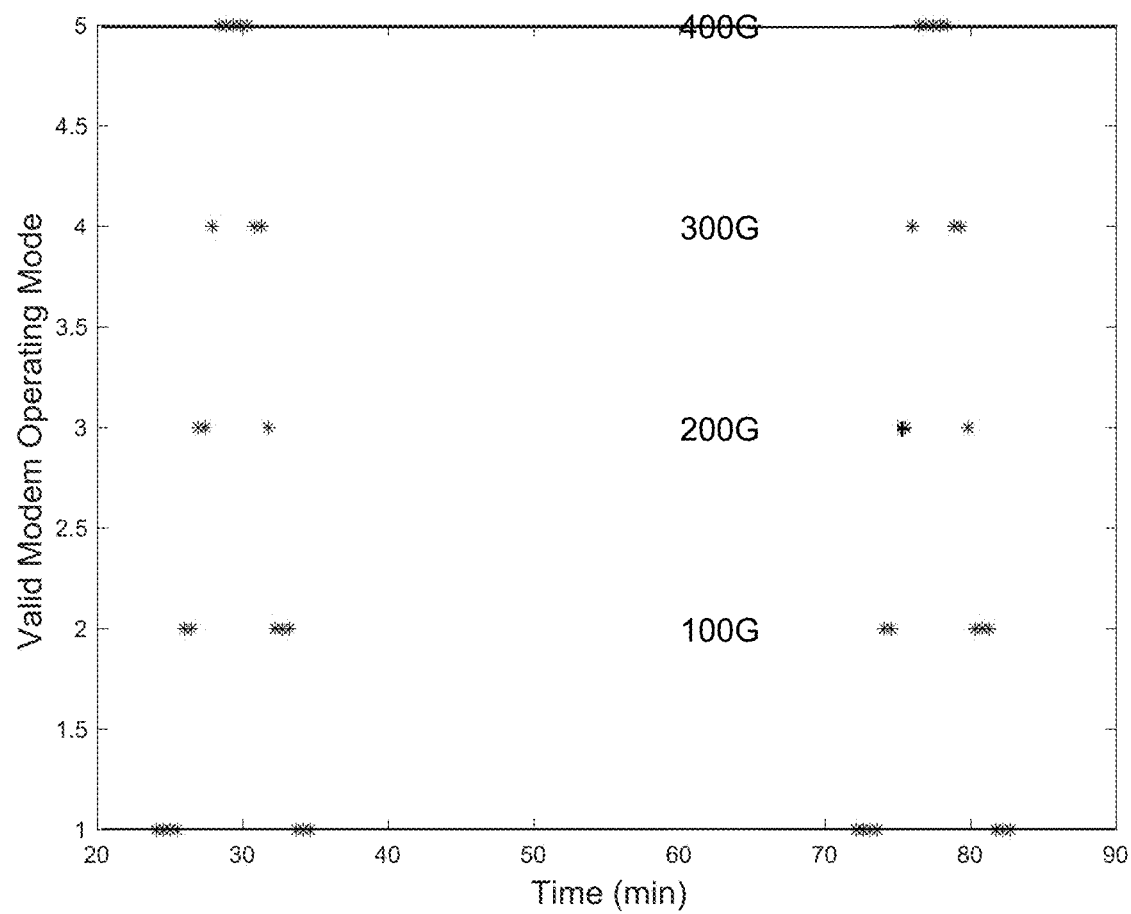

As satellites form pairs that move past each other, the distance between them changes, changing link optical budget. The orbits are stable and known as a function of time, and link parameters can be easily computed and predicted. For example, we consider two satellites counter-orbiting in 20° offset planes at 1000 km altitude. Optical transceivers can be connected to 10 cm diameter telescopes with internal 6 dB loss each, and there can be a 26 dBm booster amplifier at 1550 nm. Satellites can maintain a visual connection for ~10 min, with link budgets sufficient to maintain data rate in excess of 100 Gbps for most of that time window. (Other parameters such as Doppler shift and slew rate, telescope rotational velocity, etc. can also be easily computed). FIGS. 5B-5D are optical link parameters as a function of orbit time, with FIG. 5B illustrating distance between satellites, FIG. 5C illustrating OSNR at a receiver, and FIG. 5D illustrating supported data rate of a 400ZR transceiver.

Satellite Configuration

Figure 6:
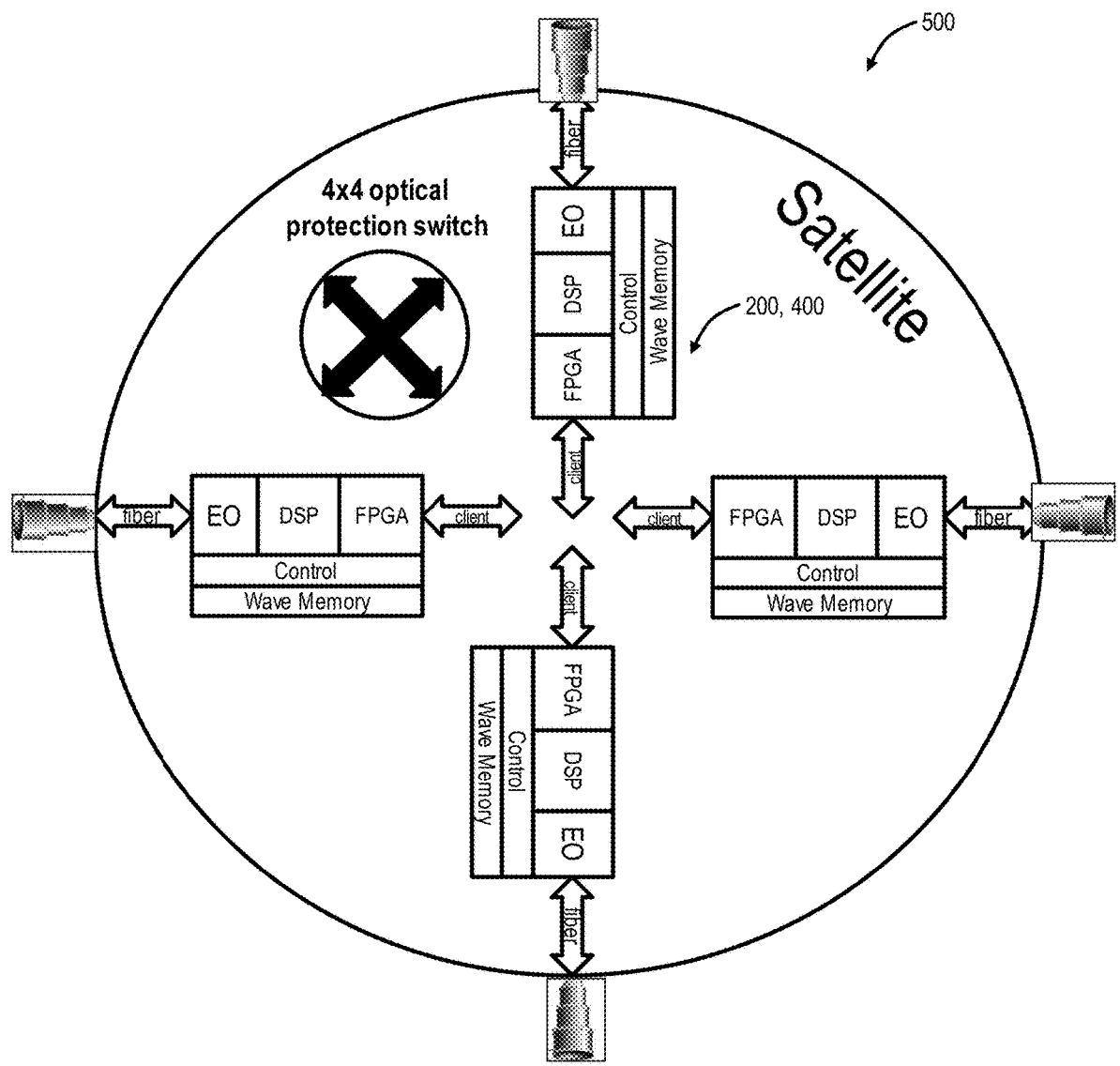
FIG. 6 is a diagram of an example satellite including four example optical transceivers.

FIG. 6 is a diagram of an example satellite 500 including four example optical transceivers 200, 400. Of course, there can be more or less optical transceivers 200, 400. For example, the top and bottom optical transceivers 200, 400 can be configured to connect to another satellite 500 that is in the same orbit—this can remain static. The left and right optical transceivers 200, 400 can connect to satellites 500 in adjacent orbits—these can change over time. There can also be optical transceivers 200, 400 to connect to ground stations, etc. Additionally, there can be an optical protection switch for optical transceiver 200, 400.

Of note, satellites have stringent Size, Weight, and Power (SWAP) requirements which drive expense for launch and operating expenses. Also, failed parts are impossible to replace. With respect to the optical transceivers 200, 400, there is a need for SWAP reduction and increasing reliability. In particular, the optical transceivers 200, 400 in FIG. 6 are shown as stand-alone, separate devices.

The present disclosure describes various techniques to share functions among the optical transceivers, i.e., optical transceivers 200, 400. Of note, the optical transceivers 200, 400 in FIG. 6 include dedicated EO, DSP, FPGA, and control and memory functions. Also, there can be dedicated storage for FPGA function definition files. The approach of sharing functions will reduce SWAP and improve reliability.

Figure 7:
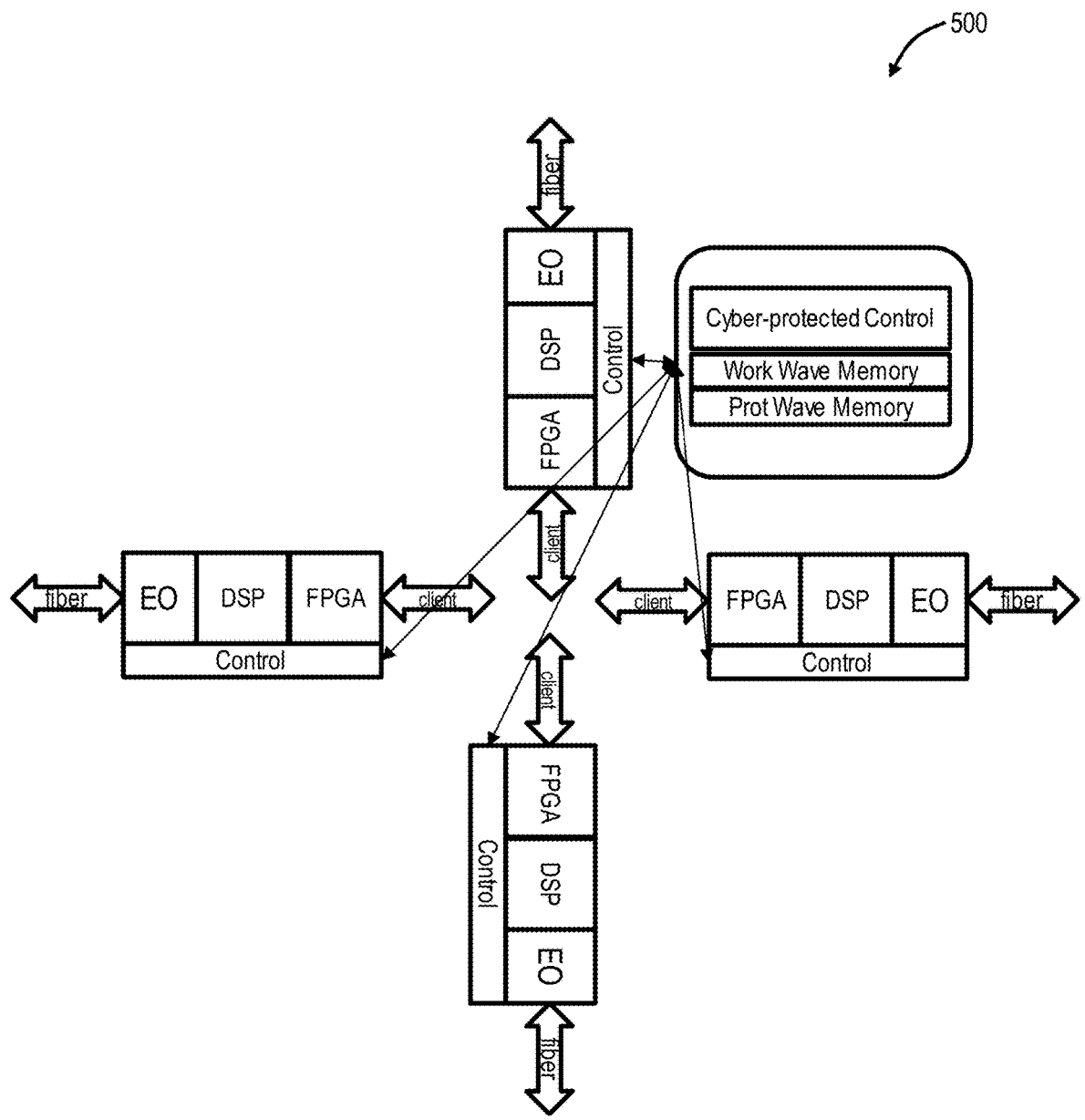
FIG. 7 is a diagram of sharing of functions for the optical transceivers in the satellite.

FIG. 7 is a diagram of sharing of functions for the optical transceivers 200, 400 in the satellite 500. In this example, there is shared waveform memory and some shared control. Cyber-protection and Comms are centralized, FPGA Function Def (Waveform) Memory are shared for power reduction, and there is Redundancy for Radiation (Rad) and Fail protection.

Figure 8:
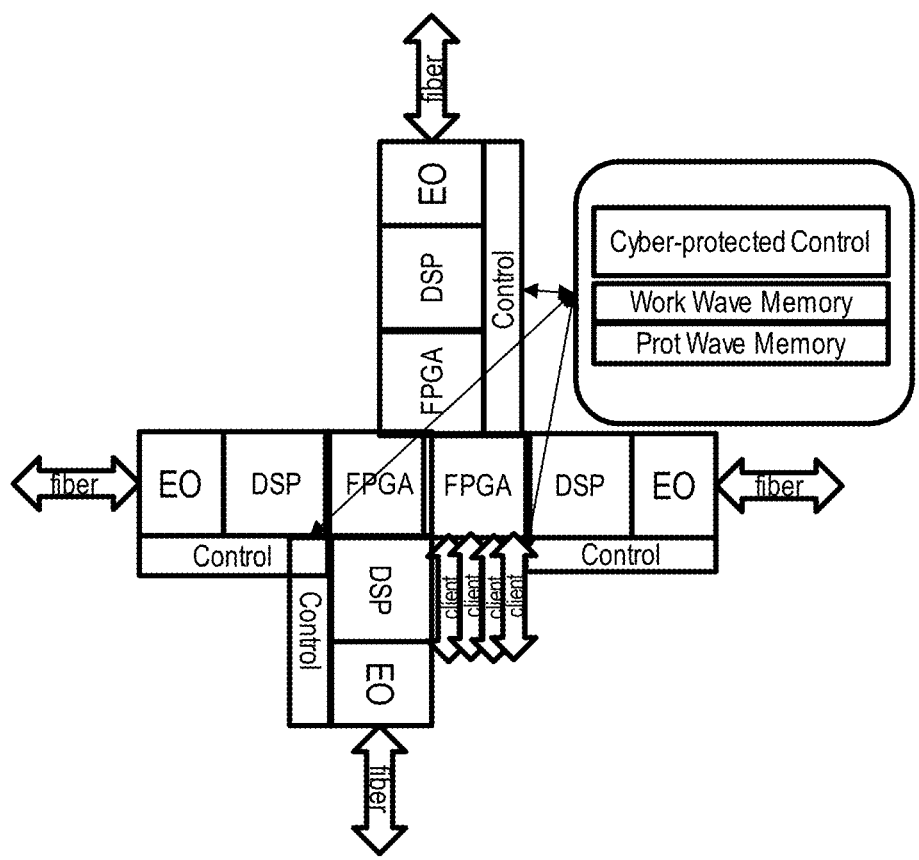
FIG. 8 is a diagram of further sharing of functions for the optical transceivers in the satellite.

FIG. 8 is a diagram of further sharing of functions for the optical transceivers 200, 400 in the satellite 500. In this example, the sharing includes the same sharing as in FIG. 8 along with the FPGAs for each optical transceiver 200, 400 being shared in a unified complex, for more efficient bit-file packing and this sharing improves redundancy for Rad failures.

Figure 9:
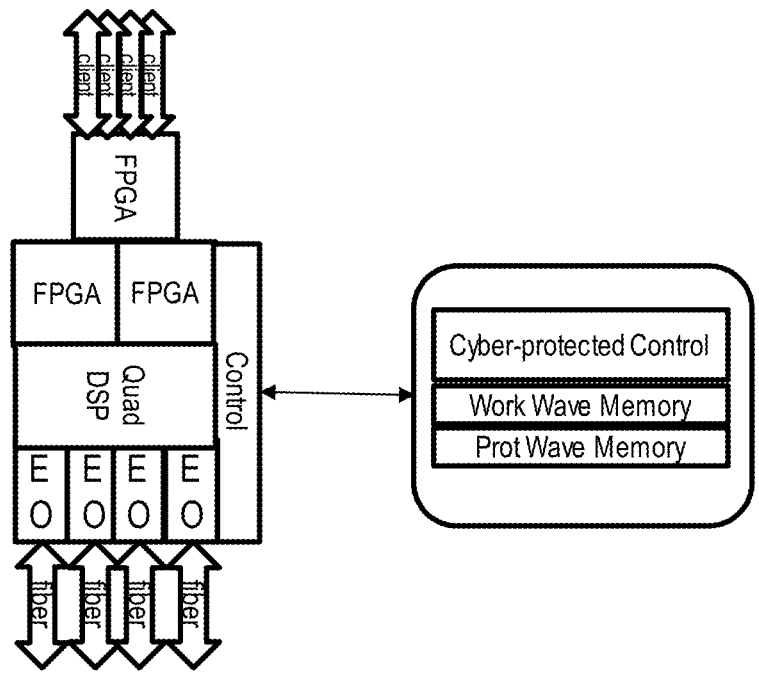
FIG. 9 is a diagram of even further sharing of functions for the optical transceivers in the satellite.

FIG. 9 is a diagram of even further sharing of functions for the optical transceivers 200, 400 in the satellite 500. Again, this includes the sharing in FIGS. 7 and 8—control & waveform memory is centralized & protected and the FPGAs form a unified complex. Additionally, the DSP is also either a unified DSP complex (shared across all optical transceivers 200, 400), a quad DSP (shared across 4 optical transceivers 200, 400), a dual DSP (shared across 2 optical transceivers 200, 400), or the like. Also, some EO components can be 1:N redundant for shared protection.

Power Reduction Through Internal Data Path Pass Through

In many cases, the satellites 500 server a purely transit purpose, i.e., data from the top optical transceiver 200, 400 is sent to the bottom optical transceiver 200, 400, etc. This is similar to an optical regenerator or OADM express. As such, it is possible to achieve power reduction since full RX decoding and TX encoding is not required at these satellites.

Figure 10:
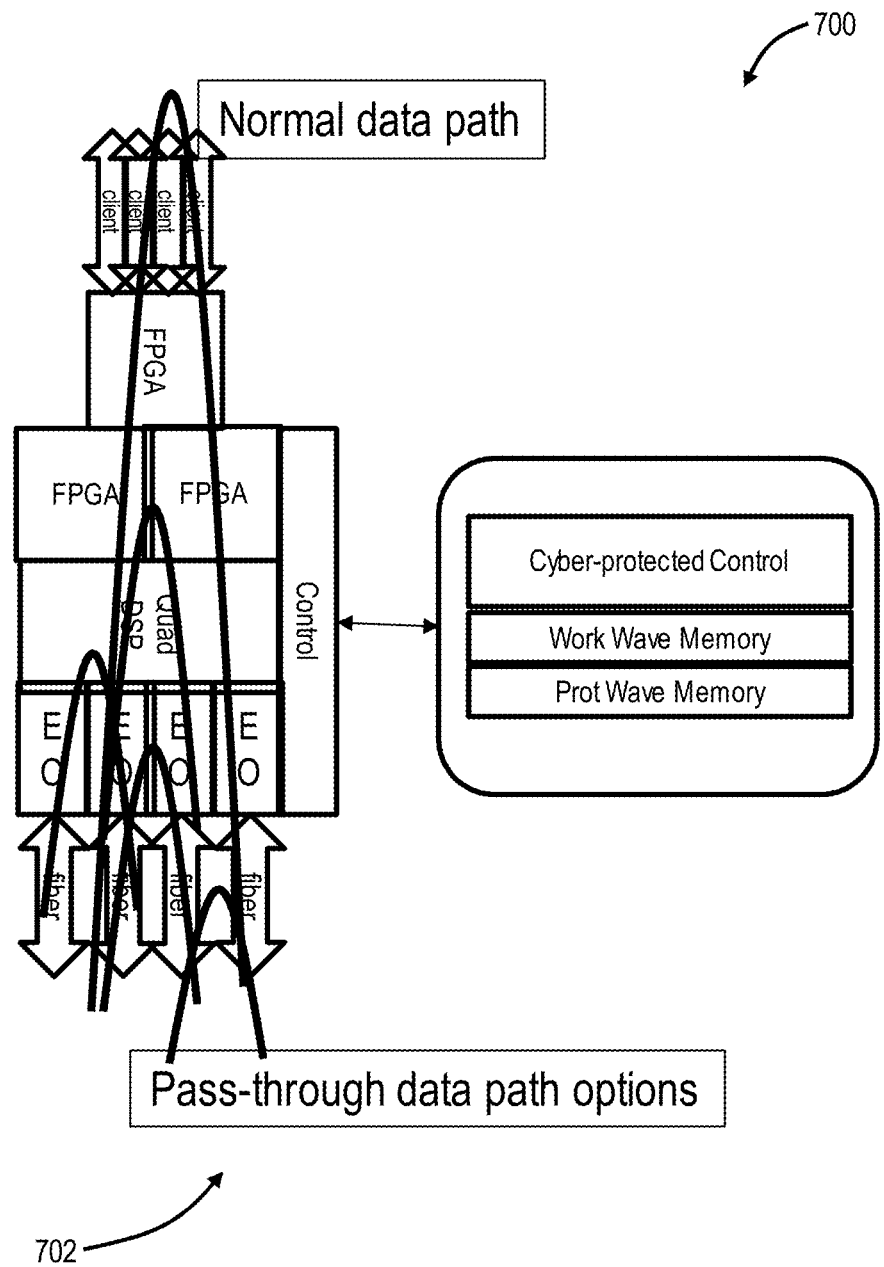
FIG. 10 is a diagram of the satellite from FIG. 9 with shared functions illustrating internal data pass through via several possible options.

FIG. 10 is a diagram of the satellite from FIG. 9 with shared functions illustrating internal data pass through via several possible options.

Figure 11:
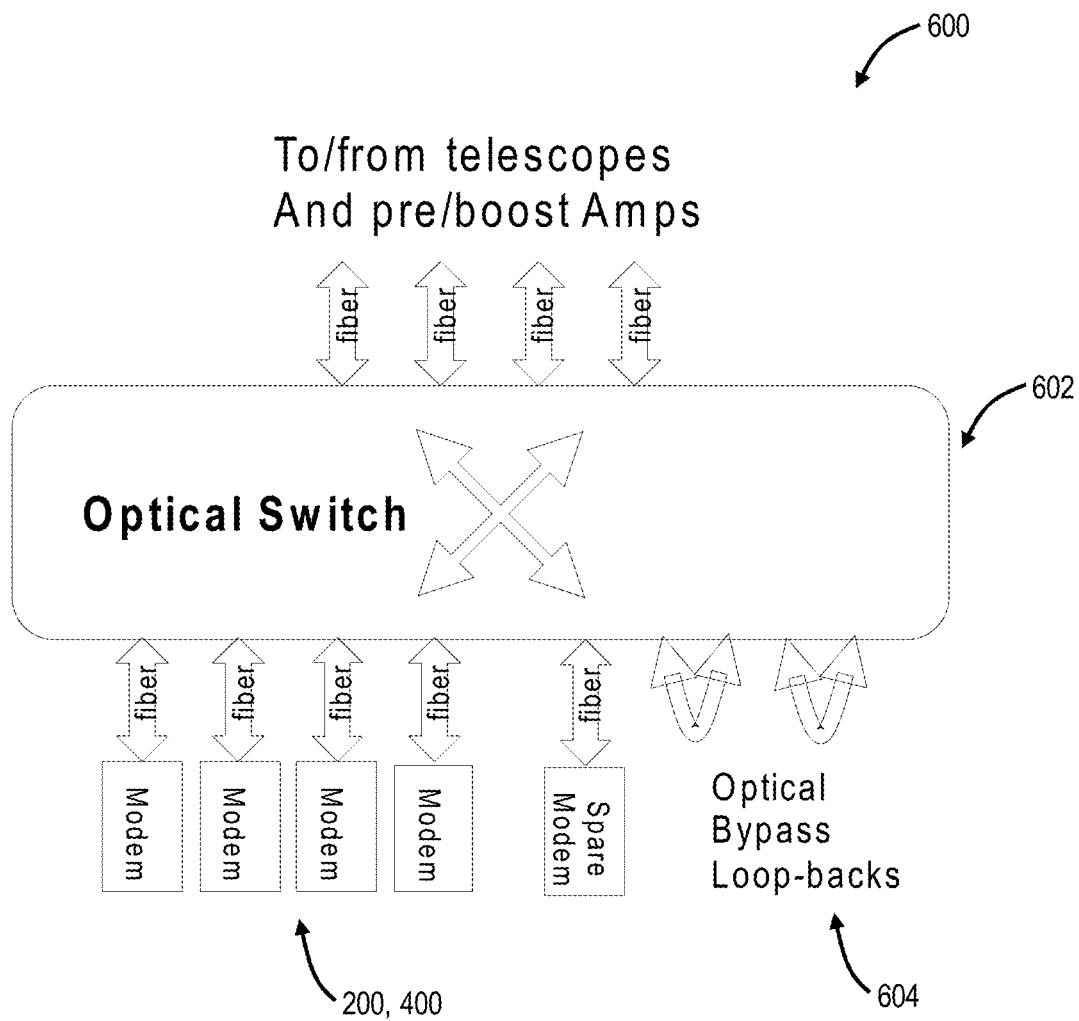
FIG. 11 is a diagram of an optical switch system for use in a satellite.

Optical Pass-Through, i.e., ROADM-Like
  Includes optical switch, i.e., 4×4
  Accumulates optical noise→need extra link margin
  Accumulates doppler shifts→need extra tracking margin
  Must use same λ1 and λ2 across full path
  No buffering→thru path must exist for inflight data
ADC to DAC Pass-Through
  Same as above, but eliminates optical switch
  Provides for λ flexibility
  Can compensate for some Doppler shift using λ tuning
  Some RF noise filtering is possible
DSP to DSP Pass-Through
  No optical switch and add λ flexibility
  Loop at constellation sample level.
  Per-hop RF filtering, Doppler compensation, Freq/Phase/Clock recovery
  Still accumulates noise
  No buffering→requires thru path for inflight data
FPGA Pass-Through
  Full RF noise clean up, i.e., if margin is deemed exhausted.
  Can drop to connected High Bandwidth Memory (HBM) if buffering is needed while path is set up
  Can avoid power-consuming FEC and postpone until packet reaches path end point, but only for Hard Decision FEC
  Can NOT store and forward soft-decision data points
All-Optical Pass-Through with Protection FIG. 11 is a diagram of an optical switch system 600 for use in a satellite 500. This embodiment can be implemented due to the typical excess optical margin present in the inter-satellite links. An optical switch 602 provides selectable interconnection from optical telescope and pre/boost amplifier front end to a selectable transceiver 200, 400 for data processing. In case of transceiver failure, a spare transceiver may also be provided, or an existing transceiver may be re-purposed from an under-utilized direction. Further, we provide optical pass-through connections 604 that effectively cascade inter-satellite optical links in a manner similar to amplified optical links in a terrestrial system.

Like terrestrial links, a doubling in the optical link count (say from 1 to 2, 2 to 4, etc.) will degrade OSNR by ~3 dB, assuming comparable links. However, there are some unique aspects to inter-satellite links. While links within an orbit are essentially permanent, links between orbits are quite short-lived and may change connections on the order of every few minutes. Also, transmit and receive wavelength are typically separated by several nm to improve optical isolation. Therefore, wavelength assignment must be coordinated across several satellites that are part of an all-optical path.

Novel Transceiver Design with Shared Redundant Components and Pass-Through

Referring back to FIG. 10, an integrated transceiver 700 is shown therein. The present disclosure can include an integrated transceiver design that goes beyond conventional multi-channel implementations. There are two additional features that can be provided in the transceiver 700:

(1) First, 1:N redundant elements that provide shared protection for specific functional blocks to deal with radiation-induced damage and possible single-event upsets and latch-ups. For example, we can provide a shared redundant laser that can be switched in as needed. There can also be some redundant DSP and FPGA computational blocks, etc.

(2) Second, we can provide pass-through data paths and allow selective shut down of unused computation elements in the transceiver. These can include:

(a) Analog TIA to Driver or Digital ADC to DAC pass-through. This configuration accumulates optical noise and Doppler shift and needs extra link margin. However, it does provide for wavelength translation if needed on cascaded links.

(b) DSP to DSP pass-through at constellation symbol sample level. This configuration allows λ translation, if needed. It further provides per-link RF signal filtering, Doppler compensation and symbol retiming. If symbols are transmitted directly after sampling, then soft-decision decoding may still be beneficial. Alternately, symbols can be hard decision sliced eliminating noise, but introducing bit errors that accumulate in cascaded links. This is not a large penalty, as 2 cascaded links degrade BER by 2× as worst case.

This pass-through functionality can also allow to programmatically bypass subsystems that have failed, are being rebooted, etc., while preserving data path and preventing path interruptions. As we can observe, complete transceiver shutdown results in power savings of ~26-32 W. And even partial shutdown of DSP+FPGA saves 18-24 W, and FPGA shutdown saves 12-16 W. These are quite substantial power savings. Also, sharing of control and profile memory complexes allows additional reductions in size, weight, cost and power consumption.

Importantly, satellite power saving produces several beneficial outcomes. First, satellite solar panel and battery size and weight can potentially be reduced, positively impactive overall SWAP. Second, battery depth of discharge can be reduced thereby extending lifetime of Lithium batteries that are typically used for powering satellites when solar panels are in the shadow. Satellite lifetime largely depends on its batteries and any battery lifetime extension is hugely beneficial.

Control Plane

Satellite networks are characterized by frequent cross-orbit link reconfigurations as satellites orbit past each other (links within a single orbit are generally stable), typically on the order of minutes. Conventional link set up steps include transmit and receive telescope alignment and active tracking as well as point-point system parameter synchronization.

In an embodiment, the present disclosure includes additional path computation steps that allow stitching together several links:
  Predictive computation of satellites involved in full path, based on orbits and required traffic matrix
  Computation of expected optical link budgets as a function of path lifetime and associated supported data capacity
  Allocation of specific wavelengths, considering both cases where wavelength translation is allowed and not allowed. An example may be to allocate $\lambda_1$ to East-West directions and $\lambda_2$ to West-East directions, etc.
  Computing optimized pass-through configuration to provide full required capacity at minimized power consumption
  Subsystem failures are monitored and control plane algorithms are invoked that force pass-throughs that bypass failures while still preserving data path operation. This may be at full or reduced capacity, depending on failures and path link budget.

Satellite

In an embodiment, a satellite includes a plurality of transceivers, each configured to selectively connect to one of another transceiver in another satellite and a ground station; and configurable pass-through between the plurality of transceivers that is configured based on a location of the satellite in a constellation. Of note, the satellite can operate in a constellation and the configurable pass-through can be configured based on a current location in the constellation. For example, if there is adequate link budget, less processing is required, or there can be an optical pass-through, etc. The objective is to reduce power and not perform all the processing, if it is not necessary. That is, the configurable pass-through provides data signal pass-through without one or more of full decoding, regeneration, and error correction, thereby saving power.

In an embodiment, the configurable pass-through can include an optical switch in the satellite. The optical switch in the satellite can be connected to the plurality of transceivers, to/from telescopes, and to/from pre/boost amplifiers, wherein the settings of the optical switch are based on current link budgets based on the location and to other satellites. The optical switch in the satellite can be connected to at least one spare transceiver.

In another embodiment, the configurable pass-through can be via circuitry interconnecting the plurality of transceivers. The plurality of transceivers can include a Field Programmable Gate Array (FPGA) for programming thereof. The plurality of transceivers can share the FPGA. The plurality of transceivers can be in an integrated transceiver design including Electro-Optic (EO) components, a Digital Signal Processor (DSP), and one or more Field Programmable Gate Arrays (FPGAs). The configurable pass-through can be via any of the Electro-Optic (EO) components, the Digital Signal Processor (DSP), and the one or more Field Programmable Gate Arrays (FPGAs). The configurable pass-through can be any of optical pass-through, analog-to-digital converter (ADC) to digital-to-analog converter (DAC) pass-through, DSP pass-through, and FPGA pass-through.

Of note, while this configurable pass-through is described with reference to a satellite network, those skilled in the art will appreciate it can be used in terrestrial networks as well.

Process

Figure 12:
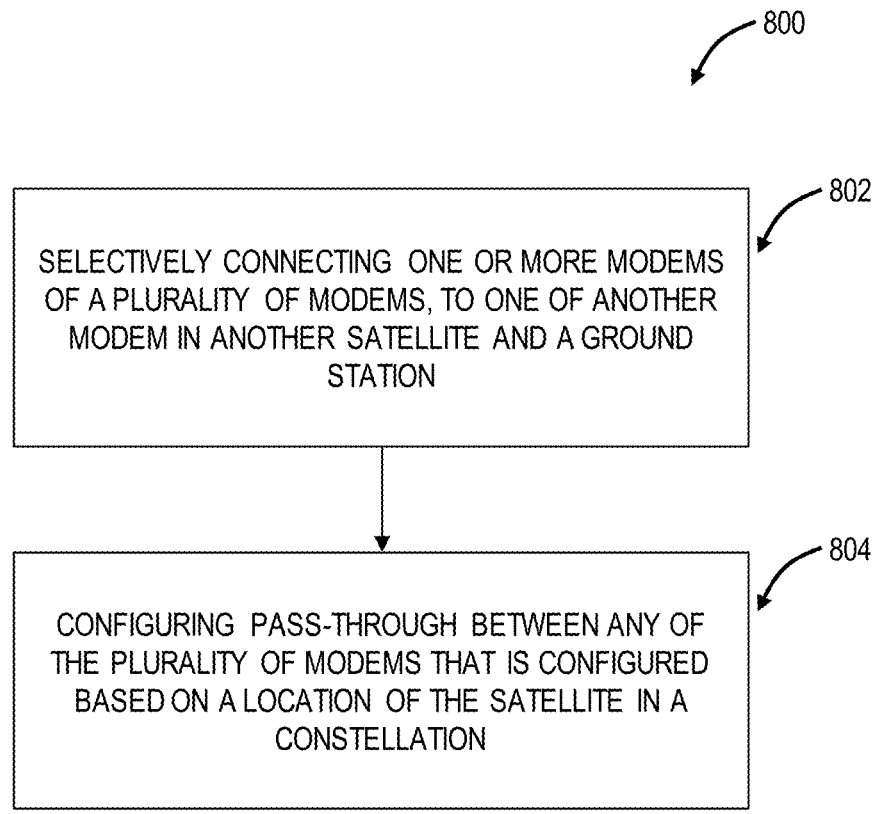
FIG. 12 is a flowchart of a process implemented in a satellite.

FIG. 12 is a flowchart of a process 800 implemented in a satellite. The process 800 includes selectively connecting one or more transceivers of a plurality of transceivers, to one of another transceiver in another satellite and a ground station (step 802); and configuring pass-through between any of the plurality of transceivers that is configured based on a location of the satellite in a constellation (step 804).

Conclusion

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A satellite comprising:
    a plurality of transceivers, each configured to selectively connect to one of another transceiver in another satellite and a ground station, wherein two transceivers of the plurality of transceivers are connected to one another in a data path; and
    configurable pass-through between the two transceivers that is configured to selectively bypass functions in the data path between the two transceivers, based on a location of the satellite in a constellation and the selective connectivity of the two transceivers.

2. The satellite of claim 1, wherein the selectively bypassed functions provide data signal pass-through without one or more of full decoding, regeneration, and error correction, selected based on the location of the satellite in the constellation and the selective connectivity of the two transceivers.

3. The satellite of claim 1, wherein the configurable pass-through includes an optical switch in the satellite.

4. The satellite of claim 3, wherein the optical switch in the satellite is connected to the plurality of transceivers, to/from telescopes, and to/from pre/boost amplifiers, wherein the settings of the optical switch are based on the location of the satellite in the constellation.

5. The satellite of claim 3, wherein the optical switch in the satellite is connected to at least one spare transceiver.

6. The satellite of claim 1, wherein the configurable pass-through is via circuitry interconnecting the plurality of transceivers.

7. The satellite of claim 1, wherein the plurality of transceivers include a Field Programmable Gate Array (FPGA) for programming thereof.

8. The satellite of claim 7, wherein the plurality of transceivers share the FPGA.

9. The satellite of claim 1, wherein the plurality of transceivers are in an integrated transceiver design including Electro-Optic (EO) components, a Digital Signal Processor (DSP), and one or more Field Programmable Gate Arrays (FPGAs).

10. The satellite of claim 1, wherein the configurable pass-through is via any of the Electro-Optic (EO) components, the Digital Signal Processor (DSP), and the one or more Field Programmable Gate Arrays (FPGAs).

11. The satellite of claim 1, wherein the configurable pass-through includes optical pass-through, analog-to-digital converter (ADC) to digital-to-analog converter (DAC) pass-through, Digital Signal Processor (DSP) pass-through, and Field Programmable Gate Array (FPGA) pass-through.

12. A method implemented in a satellite comprising steps of:
selectively connecting one or more transceivers of a plurality of transceivers, to one of another transceiver in another satellite and a ground station; and
configuring pass-through between two transceivers of the plurality of transceivers that is configured to selectively bypass functions in a data path between the two transceivers, based on a location of the satellite in a constellation and connectivity of the two transceivers.

13. The method of claim 12, wherein the selectively bypassed function provide data signal pass-through without one or more of full decoding, regeneration, and error correction, selected based on the location of the satellite in the constellation and the connectivity of the two transceivers.

14. The method of claim 12, wherein the configurable pass-through includes an optical switch in the satellite.

15. The method of claim 14, wherein the optical switch in the satellite is connected to the plurality of transceivers, to/from telescopes, and to/from pre/boost amplifiers, wherein the settings of the optical switch are based on the location of the satellite in the constellation.

16. The method of claim 14, wherein the optical switch in the satellite is connected to at least one spare transceiver.

17. The method of claim 12, wherein the configurable pass-through is via circuitry interconnecting the plurality of transceivers.

18. The method of claim 12, wherein the plurality of transceivers include a Field Programmable Gate Array (FPGA) for programming thereof.

19. The method of claim 12, wherein the plurality of transceivers are in an integrated transceiver design including Electro-Optic (EO) components, a Digital Signal Processor (DSP), and one or more Field Programmable Gate Arrays (FPGAs).

20. An optical node configured to operate in one of a satellite network and a terrestrial optical network, the optical node comprising:
a plurality of transceivers, each configured to selectively connect to another transceiver in another optical node, wherein two transceivers of the plurality of transceivers are connected to one another in a data path; and
configurable pass-through between the two transceivers that is configured based on the connectivity thereof, and that is integrated within the plurality of transceivers, wherein the configurable pass-through selectively bypassing functions in the data path between the two transceivers, based on corresponding link budgets due to the connectivity,
wherein the configurable pass-through includes optical pass-through, analog-to-digital converter (ADC) to digital-to-analog converter (DAC) pass-through, Digital Signal Processor (DSP) pass-through, and Field Programmable Gate Array (FPGA) pass-through.

* * * * *